US010865867B2

(12) United States Patent
Anand et al.

(10) Patent No.: US 10,865,867 B2
(45) Date of Patent: Dec. 15, 2020

(54) LIGHTWEIGHT TORQUE TRANSMISSION GEAR

(71) Applicant: Eaton Intelligent Power Limited, Dublin (IE)

(72) Inventors: Anuj Anand, Pune (IN); Hari Prasad Konka, Pune (IN); Peter James Fritz, Williamston, MI (US)

(73) Assignee: Eaton Intelligent Power Limited, Dublin (IE)

( * ) Notice: Subject to any disclaimer, the term of this patent is extended or adjusted under 35 U.S.C. 154(b) by 187 days.

(21) Appl. No.: 15/771,601

(22) PCT Filed: Nov. 7, 2016

(86) PCT No.: PCT/US2016/060796
§ 371 (c)(1),
(2) Date: Apr. 27, 2018

(87) PCT Pub. No.: WO2017/079730
PCT Pub. Date: May 11, 2017

(65) Prior Publication Data
US 2018/0320772 A1 Nov. 8, 2018

(30) Foreign Application Priority Data
Nov. 7, 2015 (IN) .......................... 3645/DEL/2015

(51) Int. Cl.
*F16H 55/06* (2006.01)
*F16H 55/02* (2006.01)
*F16H 55/17* (2006.01)

(52) U.S. Cl.
CPC ............. *F16H 55/06* (2013.01); *F16H 55/02* (2013.01); *F16H 55/17* (2013.01); *F16H 2055/065* (2013.01); *F16H 2055/176* (2013.01)

(58) Field of Classification Search
CPC .......... F16H 55/06; F16H 55/02; F16H 55/17; F16H 2055/065; F16H 2055/176
See application file for complete search history.

(56) References Cited

U.S. PATENT DOCUMENTS 2,064,144 A 12/1936 Benge
2,064,723 A * 12/1936 Benge ..................... F16H 55/06
74/445

(Continued)

FOREIGN PATENT DOCUMENTS

| CN | 101078432 | 11/2007 |
|---|---|---|
| DE | 102007062349 | 6/2009 |
| EP | 1143165 | 10/2001 |

OTHER PUBLICATIONS

Krantz, T.L et al., "Increased Surface Fatigue Lives of Spur Gears by Application of a Coating", 2003, 16pgs, https://ntrs.nasa.gov/archive/nasa/casi.ntrs.gov/20030068247.pdf.

*Primary Examiner* — Thomas C Diaz
(74) *Attorney, Agent, or Firm* — Dierker & Kavanaugh, P.C.

(57) ABSTRACT

A torque transmitting gear includes a steel toothed annular flange having gear teeth defined on a periphery of the steel toothed annular flange. A steel hub is coaxially aligned with the steel toothed annular flange. A web is formed from a web material having a density less than or equal to 3.0 grams per cubic centimeter. The web is fixedly attached to the toothed annular flange and to the hub for rotation together with the toothed annular flange and the hub. The gear is to operatively transmit a torque of at least 500 Newton Meters for at least 6 million revolutions of the gear. An overall mass of the gear is less than two-thirds of an overall mass of a same-sized all steel gear having a solid steel web with a solid steel web thickness at least one-third of a face width of the toothed annular flange.

22 Claims, 16 Drawing Sheets

(56) References Cited

U.S. PATENT DOCUMENTS

| | | | | |
|---|---|---|---|---|
| 2,839,943 | A * | 6/1958 | Hausmann | F16H 55/06 |
| | | | | 74/445 |
| 3,200,665 | A | 8/1965 | Wells | |
| 5,271,287 | A | 12/1993 | Wadleigh | |
| 8,595,934 | B2 * | 12/2013 | Derse | F16H 55/14 |
| | | | | 29/893.37 |
| 8,795,569 | B2 * | 8/2014 | Oberle | F16H 55/06 |
| | | | | 264/261 |
| 8,949,087 | B2 | 2/2015 | Oliverius et al. | |
| 2002/0043124 | A1 * | 4/2002 | Shiga | B29C 45/16 |
| | | | | 74/434 |
| 2006/0053917 | A1 | 3/2006 | Asari et al. | |
| 2009/0282939 | A1 * | 11/2009 | Rogowski | F16H 55/06 |
| | | | | 74/424.5 |
| 2013/0228028 | A1 | 9/2013 | Kim et al. | |
| 2018/0017150 | A1 * | 1/2018 | Leupold | B22F 7/002 |

* cited by examiner

112

WHEREIN:
THE INITIAL STRUCTURAL DESIGN INCLUDES A FIRST MATERIAL AND A SECOND MATERIAL;
THE FIRST MATERIAL AND THE SECOND MATERIAL ARE DISSIMILAR; AND
THE FIRST MATERIAL IS JOINED TO THE SECOND MATERIAL THEREBY FORMING A JOINT

113

WHEREIN THE JOINT IS A MECHANICAL INTERFERENCE-BASED JOINT

145

WHEREIN THE COMPUTER SIMULATION INCLUDES:
    AN AUGMENTED LAGRANGIAN CONTACT ALGORITHM TO DEFINE THE FRICTIONAL CONTACT BETWEEN THE FIRST MATERIAL AND THE SECOND MATERIAL AT THE INTERFERENCE-BASED JOINT; AND
    A FINITE ELEMENT METHOD ALGORITHM TO CALCULATE STRESSES AND STRAINS UNDER INTERNAL AND EXTERNAL LOADS

WHEREIN:
    THE FIRST MATERIAL IS BONDED TO THE SECOND MATERIAL BY AN ADHESIVE DISPOSED BETWEEN THE FIRST MATERIAL AND THE SECOND MATERIAL, THEREBY FORMING THE JOINT; AND
    THE JOINT IS AN ADHESIVELY BONDED JOINT

114

  

WHEREIN:
    A COHESIVE ZONE METHOD IS APPLIED TO MODEL COHESIVE ZONE ELEMENTS OF THE ADHESIVELY BONDED JOINT; AND
    A FINITE ELEMENT METHOD ALGORITHM INCLUDING A COHESIVE ZONE MODULE CALCULATES STRESSES AND STRAINS UNDER INTERNAL AND EXTERNAL LOADS

116

WHEREIN THE COHESIVE ZONE METHOD INCLUDES:
    DETERMINING TRACTION SEPARATION LAWS FOR A MODE I CRACK SEPARATION AND A MODE II CRACK SEPARATION OF THE FIRST MATERIAL AND THE SECOND MATERIAL BONDED BY THE ADHESIVE;
    DEFINING THE COHESIVE ZONE ELEMENTS IN A FINITE ELEMENT MODEL, WHEREIN DEFINING THE COHESIVE ZONE ELEMENTS INCLUDES GENERATING A MESH FOR THE COHESIVE ZONE ELEMENTS AND APPLYING THE TRACTION SEPARATION LAWS AS ELEMENTAL PROPERTIES OF THE COHESIVE ZONE ELEMENTS; AND
    EXECUTING THE FINITE ELEMENT METHOD ALGORITHM INCLUDING THE COHESIVE ZONE MODULE

WHEREIN THE DETERMINING TRACTION SEPARATION LAWS INCLUDES EMPIRICALLY DETERMINING THE TRACTION SEPARATION LAWS FROM A DOUBLE CANTILEVER BEAM TEST TO DETERMINE THE TRACTION SEPARATION LAW FOR THE MODE I CRACK SEPARATION AND A LAP SHEAR TEST TO DETERMINE THE TRACTION SEPARATION LAW FOR THE MODE II CRACK SEPARATION

118

WHEREIN:
    THE DOUBLE CANTILEVER BEAM TEST METHOD IS DEFINED BY ASTM D5528;
AND
    THE LAP SHEAR TEST METHOD IS DEFINED BY ASTM D5868

WHEREIN VARYING THE TOPOLOGY OPTIMIZATION PARAMETERS INCLUDES:
    DETERMINING AN ELEMENTAL DENSITY FOR EACH ELEMENT OF THE FINITE ELEMENT MODEL;
    DETERMINING A MINIMUM DENSITY THRESHOLD BASED ON A WEIGHT SAVINGS PERCENTAGE TARGET AND A MAPPING OF THE ELEMENTAL DENSITY ON THE FINITE ELEMENT MODEL;
    SETTING THE ELEMENTAL DENSITY TO ZERO FOR EACH OF THE ELEMENTS OF THE FINITE ELEMENT MODEL HAVING AN ELEMENTAL DENSITY LESS THAN A MINIMUM DENSITY THRESHOLD; AND
    ASSIGNING THE ELEMENTAL DENSITY TO 1 FOR EACH OF THE ELEMENTS OF THE FINITE ELEMENT MODEL HAVING AN ELEMENTAL DENSITY GREATER THAN OR EQUAL TO THE MINIMUM DENSITY THRESHOLD; AND
    VARYING THE TOPOLOGY OPTIMIZATION PARAMETERS IN THE ELEMENTS OF THE FINITE ELEMENT MODEL HAVING THE ELEMENTAL DENSITY ASSIGNED TO 1

FIG. 6

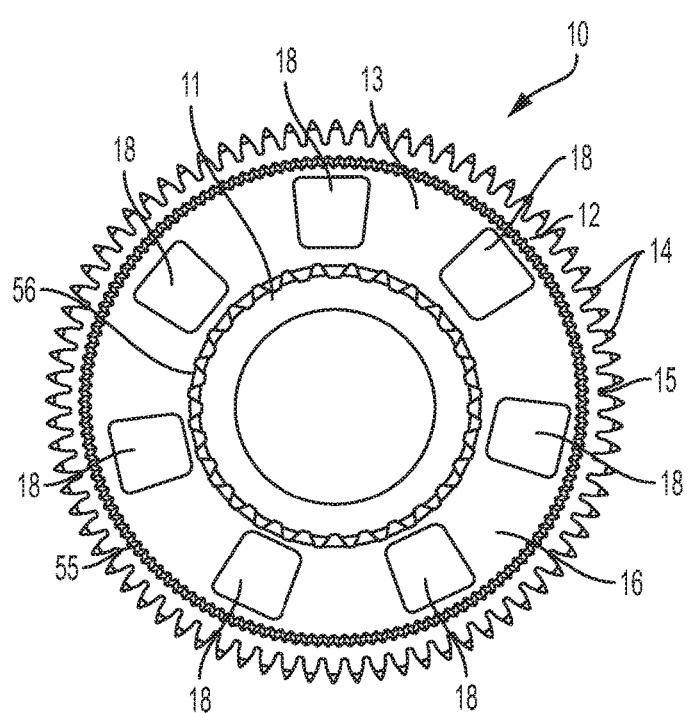
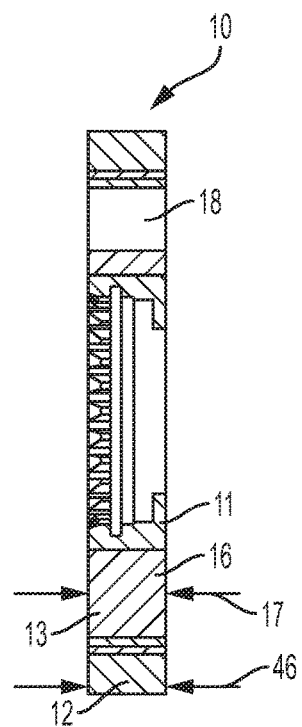
FIG. 24A   FIG. 24B
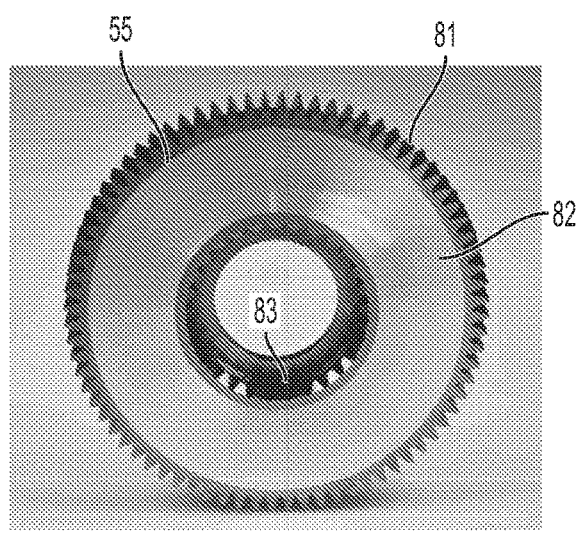
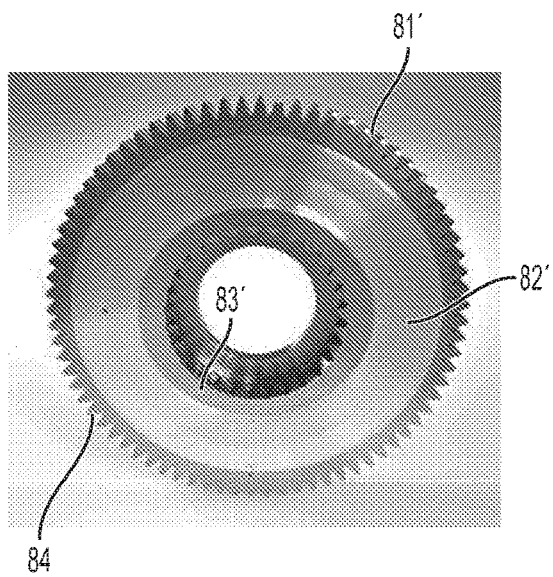
FIG. 25   FIG. 26

US 10,865,867 B2

LIGHTWEIGHT TORQUE TRANSMISSION GEAR

CROSS-REFERENCE TO RELATED APPLICATIONS

This application claims the benefit of Indian Provisional Application No. 3645/DEL/2015, filed Nov. 7, 2015, the contents of which are incorporated herein by reference.

BACKGROUND

Efficient and lighter components/systems are applied to consumer and industrial products across the spectrum of human endeavor. Vehicles that include lightweight devices can reduce energy consumption and reduce engine emissions. Industrial, automotive, and aviation business sectors place an emphasis on the design, procurement and production of lighter and more efficient systems. The combination of composite materials with other materials in structural (load-bearing) components has contributed to lighter and more efficient systems.

Aluminum is currently one of the most used lightweight materials in aviation. Many aircraft structural parts are made from aluminum alloys. Some wind turbine manufacturers use glass fiber and carbon fiber composites as structural materials for wind turbine blades. Advanced plastics (e.g., for automotive vehicle fenders and doors) and improved steel alloys (e.g., for automotive vehicle chassis components) are used to reduce weight in automobiles.

SUMMARY

A gear for transmitting torque includes a steel toothed annular flange having gear teeth defined on a periphery of the steel toothed annular flange. The gear has a steel hub coaxially aligned with the steel toothed annular flange. The gear further includes a web formed from a web material having a density less than or equal to 3.0 grams per cubic centimeter ($g/cm^3$). The web is fixedly attached to the steel toothed annular flange and to the steel hub for rotation together with the steel toothed annular flange and the steel hub. The gear is to operatively transmit a torque of at least 500 Newton Meters (N·m) for at least 6 million revolutions of the gear. An overall mass of the gear is less than two-thirds of an overall mass of a same-sized all steel gear having a solid steel web with a solid steel web thickness at least one-third of a face width of the steel toothed annular flange.

BRIEF DESCRIPTION OF THE DRAWINGS

Features and advantages of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

FIG. 2-FIG. 7 together are a flow chart depicting an example of the computer implemented method for designing a mechanical structure as disclosed herein;

FIG. 24A is a semi-schematic front view depicting an example of a gear according to the present disclosure;

FIG. 24B is a semi-schematic side view depicting the example of the gear depicted in FIG. 24A according to the present disclosure;

FIG. 25 is a front view photograph of a gear with a round annular core and shrink fit joints designed using conventional methods;

FIG. 26 is a front view photograph of a gear with an oval annular core and shrink fit joints designed using conventional methods;

DETAILED DESCRIPTION

Figure 1:
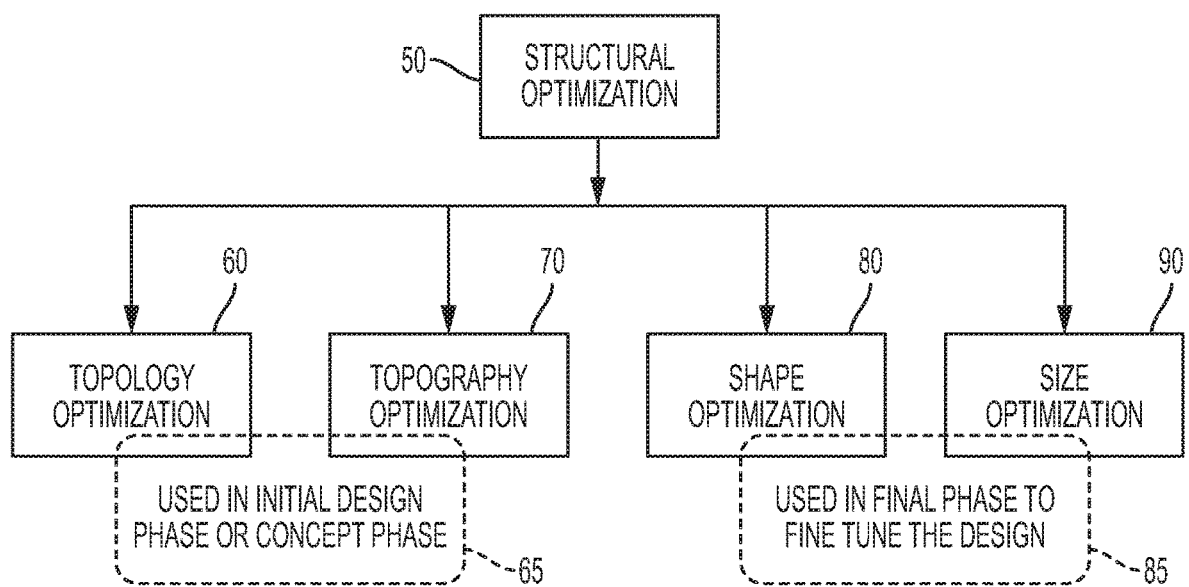
FIG. 1 is a block diagram that schematically depicts structural optimization according to the present disclosure.

Combining lighter materials, e.g., fiberglass, carbon composite, aluminum, magnesium, or plastic with other materials, for example, steel in structural components, may form dissimilar material joint interfaces. Low functional performance of the joint between the dissimilar materials, may lead to an inability of an otherwise suitable device to meet overall performance objectives. For example, galvanic corrosion at the interface between an aluminum and steel component may be deleterious to strength, durability and appearance of the aluminum and steel component. Further, differences in coefficients of thermal expansion, modulus of elasticity, strength, and ductility of joined materials may affect suitability of a device for a particular use.

Certain techniques may be used to join dissimilar materials. Typically, welding is not used to join dissimilar metals. For example, aluminum is not typically welded to steel. Mechanical interference based joining techniques (thermal shrink-fit and mechanical press-fit) may be used for joining dissimilar metals. Adhesively bonded joints may be used for joining dissimilar metal components and dissimilar non-metal components.

The thermal shrink-fit process applies the phenomenon of material expansion and contraction during the heating and cooling cycle respectively, thus achieving mechanical interference without significant assembly force. Thermal shrink-fit based techniques may be used in mechanical assembly and for delicate parts where an application of significant mechanical pressure or force could be deleterious to the functionality of the final assembly. Thermal shrink-fitting may advantageously reduce stresses and residual deformations (e.g. by reducing interference). Heating for the process of creating a thermal shrink-fit joint may be by any suitable method, including conduction, convection, and induction heating, among others.

A press-fit process may, for example, be used in industrial production for low-cost and high-throughput manufacturing. A press-fit is a semi-permanent assembly process for joining two mechanical components. The mechanical components are locked together by friction at the press-fit joint formed between the mechanical components after forcing the parts with mechanical interference therebetween, together.

Adhesive bonding is a material joining process in which an adhesive, placed between the adhered surfaces, solidifies to produce an adhesive bond. Adhesive bonding may have advantages over classical mechanical fastening techniques. For example, the application of adhesive bonding may be advantageous for improvements in strength-to-weight ratio, design flexibility, ease of fabrication, ability to join thin and dissimilar components, and low manufacturing cost.

Joining techniques may create residual stresses in a component which may affect the overall fatigue performance of the component. Accurately predicting the stresses at interfaces of dissimilar materials due to the joining technique may lead to a more rapid development of reliable products.

As disclosed herein, an effective and efficient design can be achieved within user-defined constraints through structural optimization. The present disclosure provides details of a computer implemented method for designing a torque transmitting structure. The present disclosure also includes a detailed example of a gear for transmitting torque that was refined using the method disclosed herein. It is to be understood that the method of the present disclosure may be applied to any rotational components in a drivetrain including shafts, gears, and other components that transmit rotational energy, have mass, and in vehicles, have the capability of transmitting torque at different locations, speeds, and directions. The present disclosure includes the shafts, gears, and other components designed using the method of the present disclosure. Some advantages of the devices and method of the present disclosure may not be recognized when the rotational component is lightly loaded. For example, the existing, slow moving gears of a grandfather clock may be for smoothly and accurately converting the reciprocating motion of a pendulum into rotational motion of the clock's hands. The torques experienced by the gears of the grandfather clock may not be particularly large. However, the spur gears, helical gears, shafts and clutches in a large truck transmission may experience torques of well over 500 Newton Meters. Existing bi-material gears, for example plastic gears with metal teeth, are used in relatively low torque applications and are not durable or reliable in applications with torques over 500 N·m.

The gear example of the present disclosure gives about a 33% weight reduction compared to the existing steel gear that has proven to be reliable and durable in transmissions of large trucks. A 33% weight reduction in the gears of a truck transmission would translate to about 0.5 percent of the weight of the truck, which would yield about 0.2% improvement in the fuel efficiency. The method of the present disclosure was applied to design an example of a gear disclosed herein. Working examples of a gear were made and tested. The example gear was far superior to examples of gears designed using more conventional techniques.

In an example of the present disclosure, a gear for a large truck transmission has a steel toothed flange. The steel toothed flange has high strength and durability. The highest loads experienced by the gear are at the surfaces of the steel teeth, In turn, torsion stresses are spread, and are transmitted through larger cross sectional areas of the gear, where alternative materials other than steel can be used. One such material may be a fiber reinforced polymer composite as disclosed herein. The stresses may be so low, in certain locations on the gear, that portions of the gear may be made with holes or voids. The steel, the alternative material, and the voids have multiple interactions and concurrencies that are too complex to resolve by existing methods. For example, the optimization of the present disclosure generates an optimized design for load-bearing, deformation, durability, joinery, voiding, and cost.

In an example of the method of the present disclosure, where an interface of materials geometry, voids in the interface, voids in the metal, voids in the composite, amount and thickness of composite and the size, distribution, and contour characteristics of the voids are simultaneously optimized to create the most desirable gear for power transmission. As disclosed herein, an effective and efficient design can be achieved within user-defined constraints through structural optimization. FIG. 1 is a block diagram that schematically depicts structural optimization 50 according to the present disclosure. As used herein, structural optimization 50 may have the following sub-processes: Topology Optimization 60; Topography Optimization 70; Shape Optimization 80; and Size Optimization 90. As indicated by box 65 and disclosed herein, Topology Optimization 60 and Topography Optimization 70 may be applied in a concept phase or initial design phase. As indicated by box 85 and disclosed herein, Shape Optimization 80 and Size Optimization 90 may be used in a final phase to fine tune the design.

Topology optimization 60 is a method that can be used in very early stages of a design process to determine an optimal material layout in a given design space. For example, topology optimization 60 may determine that a multilayer sheet metal structure will have a steel inner layer and an aluminum outer layer. Topography optimization 70 is a method that, for example, may find the most efficient bead layout or bead pattern in sheet metal structures.

Shape optimization 80 is a process that allows changes in the boundary of product geometry. Boundaries are typically represented as smooth surfaces in Finite Element Models since irregular boundaries may affect the accuracy of finite element analysis. In shape optimization 80, selected design variables are varied with multiple iteration until the defined constraints and objective are fulfilled.

Size optimization 90 is a process to optimize the structure by changing sizes of the components. In an example of size optimization 90 as disclosed herein, the design variables may be sizes of structural elements such as a diameter of a rod or a thickness of a beam.

The following is a mathematical formulation for an optimization problem:
Objective: Minimize $W(x)$
Constraints: $h(x) \leq 0$
Design variables: $x_{lower} \leq x \leq x_{upper}$ W is an objective function, and h is a constraint function. In an example, the objective function and the constraint function may be related to structural performance and x may represent elemental density. In the second example described more fully below, the structural responses that were used to define the objective and constraint functions were: volume fraction, compliance, stress, and deformation. Minimizing the mass was the key objective of this example of the topology optimization 60, subjected to stress and displacement constraints, with elemental density as a design variable.

Figure 2:
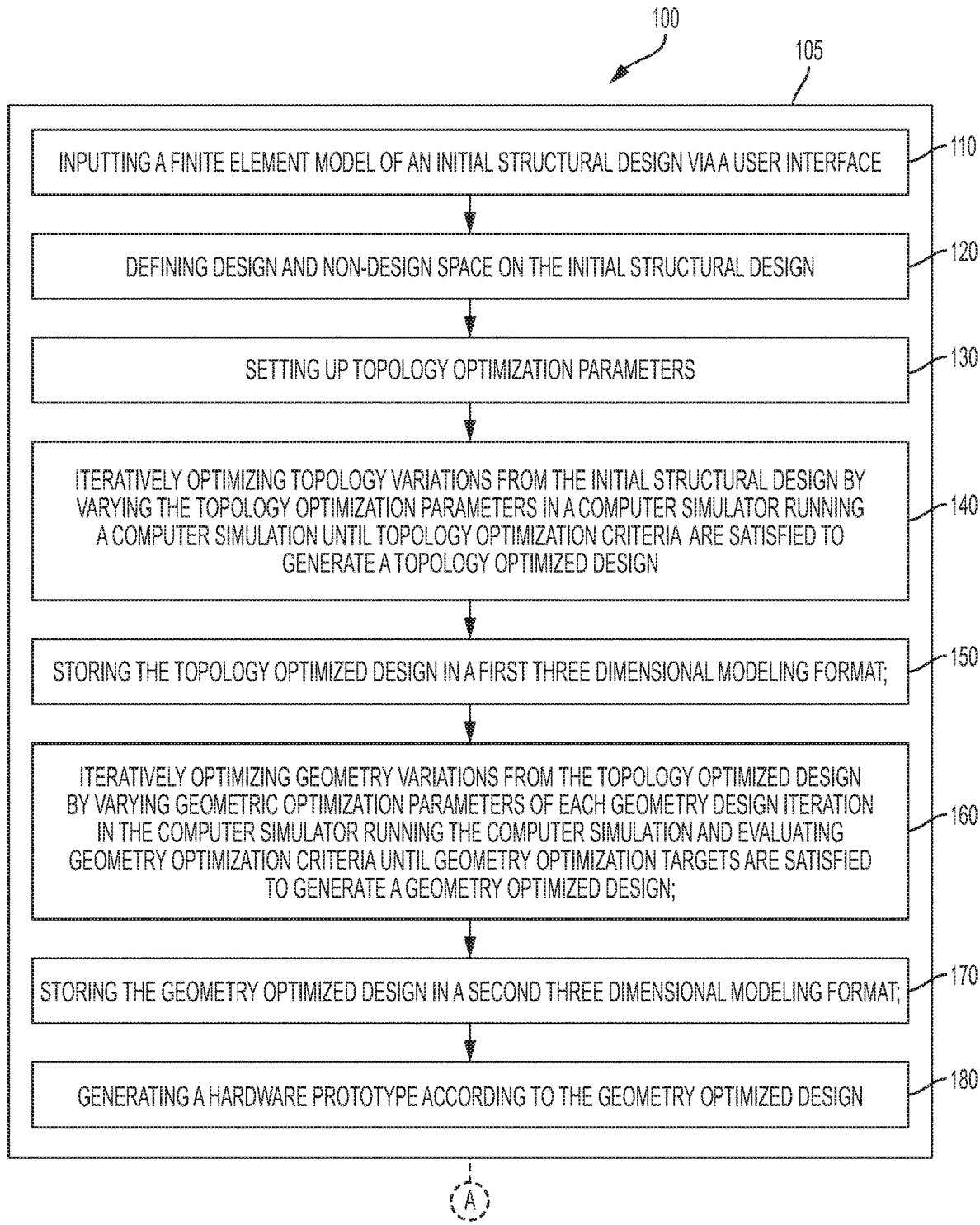

FIG. 2-FIG. 7 together are a flow chart depicting an example of the computer implemented method 100 for designing a mechanical structure as disclosed herein. FIG. 2 depicts a set of steps shown in box 105 included in the method 100. A flow chart connector A indicates the connection between box 105 and box 112 shown in FIG. 3. Dashed lines in the flow chart of FIG. 2-FIG. 7 depict elements and steps that may be implemented optionally in the method 100 according to the present disclosure.

In FIG. 2, box 110 depicts, "inputting a finite element model of an initial structural design via a user interface." For example, a Computer Aided Design (CAD) model may be created at a design workstation (the user interface) or imported from a computer memory at the command of an operator manipulating controls of the user interface. A finite element mesh that divides the CAD model into elements is generated at the design workstation. In some examples of the present disclosure, the finite element mesh is generated automatically.

Figure 8:
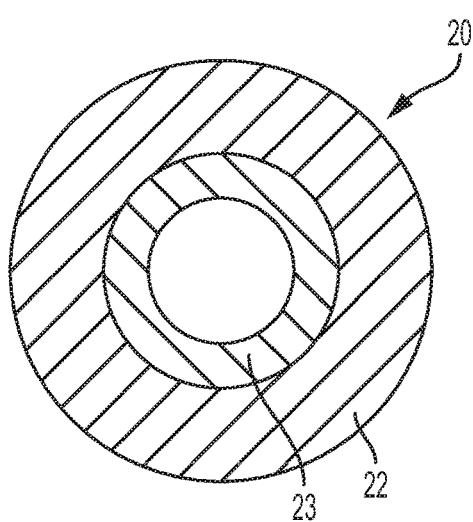
FIG. 8 is a semi-schematic cross-sectional view of a two layer multilayer tube constructed from dissimilar materials in an example of the present disclosure.
Figure 9:
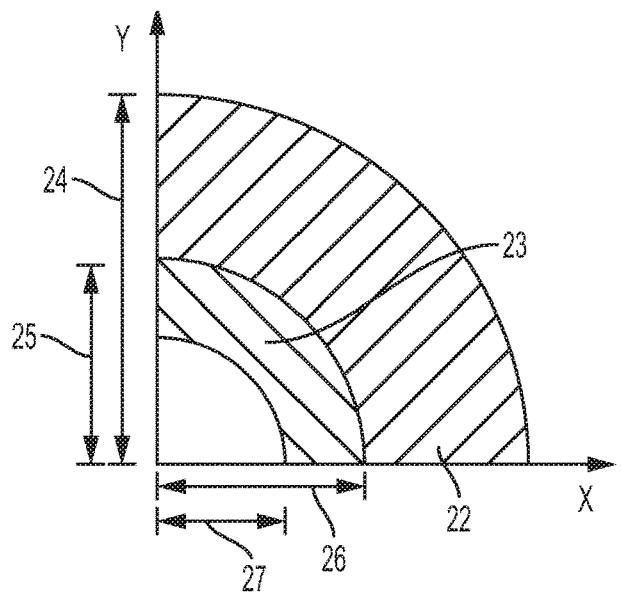
FIG. 9 is a semi-schematic cross-sectional view of a single quadrant of the multilayer tube depicted in FIG. 8.

At FIG. 2, box 120, is "defining design and non-design space on the initial structural design." In a first example used to illustrate the method 100, the initial structural design may be a multilayer tube 20 as shown in FIG. 8. In examples of the present disclosure, the multilayer tube 20 may be a short or a long tube. A short tube has a length to diameter aspect ratio of under about 10. A long tube has a length to diameter aspect ration of greater than about 10. Because of the symmetry of the multilayer tube 20, the design space can be reduced to a single quadrant of the cross-section, as shown in FIG. 9. Reducing the design space reduces the time to generate a finite element mesh, and reduces computation time in a computer simulator. In FIG. 2, at box 130, is "setting up topology optimization parameters." At box 140 is "iteratively optimizing topology variations from the initial structural design by varying the topology optimization parameters in a computer simulator running a computer simulation until topology optimization criteria are satisfied to generate a topology optimized design." At box 150 is "storing the topology optimized design in a first three dimensional modeling format." Non-limiting examples of the first three dimensional modeling format include .iges and .stl formats. At box 160 is "iteratively optimizing geometry variations from the topology optimized design by varying geometric optimization parameters of each geometry design iteration in the computer simulator running the computer simulation and evaluating geometry optimization criteria until geometry optimization targets are satisfied to generate a geometry optimized design." At box 170, is "storing the geometry optimized design in a second three dimensional modeling format." Non-limiting examples of the second three dimensional modeling format include .iges and .stl formats. The first three dimensional modeling format may be the same, or differ from the second three dimensional modeling format. At box 180 is "generating a hardware prototype according to the geometry optimized design."

In FIG. 3, the flowchart connector A indicates the connection between box 105 shown in FIG. 2 and box 112. In box 112, FIG. 3 depicts "wherein: the initial structural design includes a first material and a second material; the first material and the second material are dissimilar; and the first material is joined to the second material thereby forming a joint." At box 113, is "wherein the joint is a mechanical interference-based joint." At box 145, is "wherein the computer simulation includes: an Augmented Lagrangian contact algorithm to define a frictional contact between the first material and the second material at the interference-based joint; and a finite element method algorithm to calculate stresses and strains under internal and external loads."

FIG. 9 is a detailed view of a quadrant of the cross-sectional view depicted in FIG. 8. The multilayer tube 20 shown in FIG. 8 and FIG. 9 has an outer cylinder 22 made from steel having an elastic modulus of about 200 GigaPascals (GPa) and a Poisson's ratio of about 0.27. The outer cylinder outer radius 24 is 180 millimeters (mm). The outer cylinder inner radius 25 is 100 mm. The multilayer tube 20 shown in FIG. 8 and FIG. 9 has an inner cylinder 23 made from aluminum having an elastic modulus of about 72 GPa and a Poisson's ratio of about 0.30. The inner cylinder outer radius 26 is 100 mm. The inner cylinder inner radius 27 is 60 mm. When the finite element model is input (i.e. step 110) for the initial structural design of the multilayer tube 20, the initial penetration of the inner cylinder 23 on the outer cylinder 22 is 0.1 mm. For example, the finite element model of the initial structural design may represent a press-fit joint or a shrink fit joint between the inner cylinder 23 and the outer cylinder 22 with an overlap of 0.1 mm. Because of the elasticity of the inner cylinder 23 and the outer cylinder 22, the initial penetration of 0.1 mm is shared partly by the expansion of the outer cylinder 22 and partly by the compression of the inner cylinder 23. In the present disclosure, computer simulation is, in part, used to determine what portion the inner cylinder 23 and the outer cylinder 22 each contribute to absorbing the initial penetration. A press-fit joint and a shrink fit joint are examples of mechanical interference-based joints included at block 113 of FIG. 3.

Figure 10A:
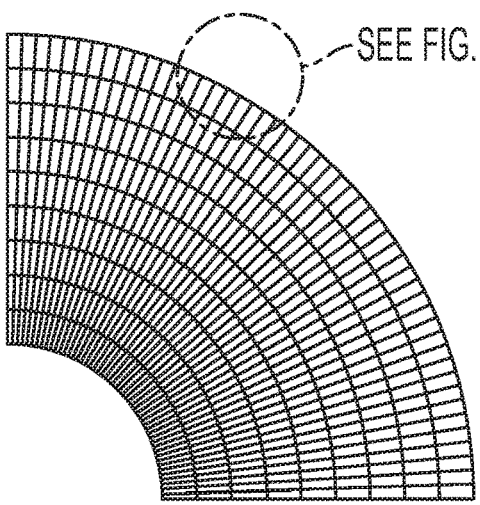
FIG. 10A is a cross-sectional view depicting a finite element mesh generated on the cross-section depicted in FIG. 9.
Figure 10B:
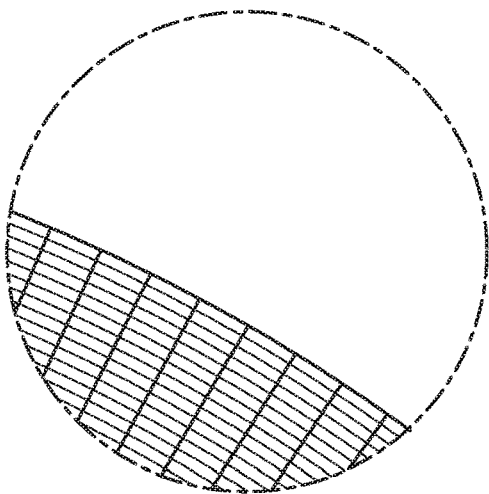
FIG. 10B is a cross-sectional detailed view of a portion of the finite element mesh depicted in FIG. 10A.
Figure 11:
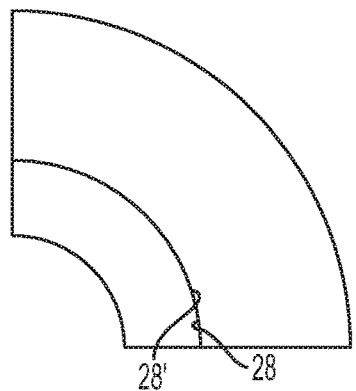
FIG. 11 is a cross-sectional view depicting the single quadrant of the multilayer tube depicted in FIG. 9 with contact edges at the indicated locations.
Figure 12:
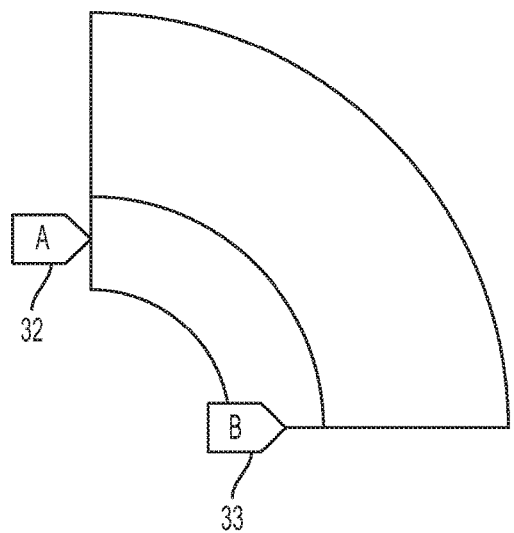
FIG. 12 is a cross-sectional view depicting the single quadrant of the multilayer tube depicted in FIG. 9 defining symmetric boundary conditions for the finite element model.

FIG. 10A and FIG. 10B depict a finite element mesh generated on the cross-section depicted in FIG. 9. Friction is modeled on FIG. 11 at the contact edges 28, 28' between the inner cylinder 23 and the outer cylinder 22. FIG. 12 depicts definition of symmetric boundary conditions on the finite element model. A first symmetry region boundary is depicted at reference numeral 32 and a second symmetry region boundary is depicted at reference number 33.

To simulate a press-fit joint, elements with appropriate properties are defined between the mating surfaces in the finite element model. The following three types of elements may be used in combination to simulate a press-fit joint: (1) Contact elements (2) Gap elements (3) Beam elements. Other elements that further define geometries and constitutive capability or interactions can also be used.

In a simulation including the contact elements, a set of contact elements are created between the contacting surfaces with an appropriate interference value. Gap elements connect elements that come into contact during a static analysis and a force exerted by the gap element is a function of its length or nodal distance.

The simulation may include linear or non-linear analysis. A force-displacement function for the elements in the finite element model depends on whether the simulation uses linear or non-linear analysis. Contact elements find the location where contact occurs. However, in simulations with gap elements, contact is defined to occur at the gap elements.

In the first example (FIG. 8), an Augmented Lagrangian algorithm was used to simulate the press-fit with contact elements. The coefficient of friction, interference value and geometrical dimension of the inner cylinder 23 and the outer cylinder 22 were some of the parameters for simulating the design of the press-fit multilayer tube 20. PLANE 183 elements were used in the simulation of the first example. Frictional contacts with coefficient of friction of 0.3 were defined between the contact edges. The element types were CONTA172 and TARGE169. The Augmented Lagrangian contact algorithm simulated the 0.1 mm interference with frictional contact.

The results of the example simulation were presented using color contour plots. However, since color contour plots would not reproduce well in black and white figures herein, some of the results of the example simulation are presented as follows: Radial deformation at the outer cylinder 22 was 0.03 mm (elongation) and at the inner cylinder 23, the radial deformation was 0.07 mm (compression). The summation of total radial deformation was 0.1 mm which is equal to the input interference entered in the finite element model through the contact offset parameter.

The multilayer tube 20 was chosen as for the first example to illustrate the method 100 of the present disclosure because classical analytical methods may be used to verify the results of the disclosed Finite Element Analysis based simulation for the multilayer tube 20. The classical analytical method is provided below for comparison.

Figure 13:
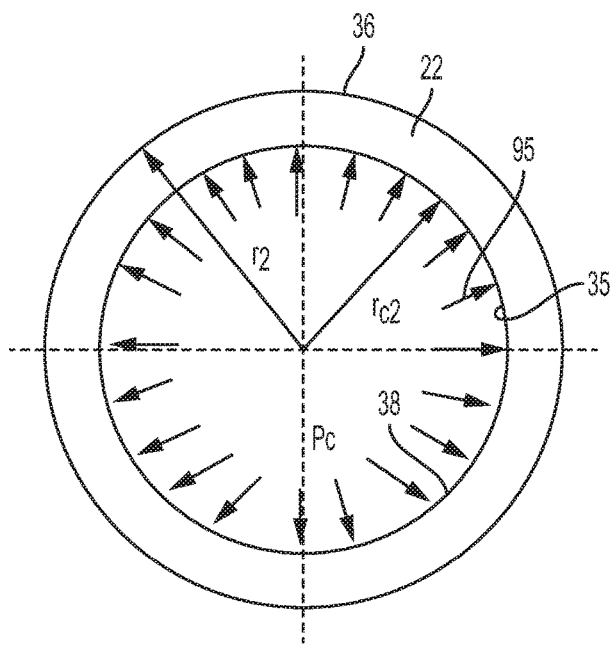
FIG. 13 is a schematic cross-sectional view depicting pressure on the outer cylinder of the multilayer tube depicted in FIG. 8.
Figure 14:
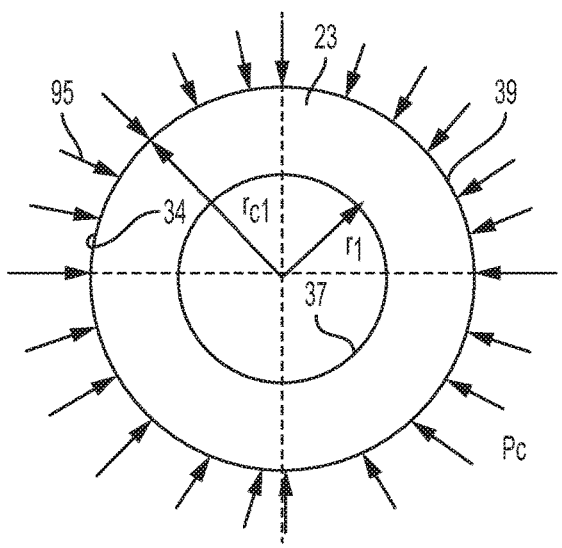
FIG. 14 is a schematic cross-sectional view depicting pressure on the inner cylinder of the multilayer tube depicted in FIG. 8.

FIG. 13 illustrates the pressure 95 at the outer cylinder contact surface 35 and FIG. 14 illustrates the pressure 95 at the inner cylinder contact surface 34.

Equation (2) is used to calculate the radial stress $\sigma_r$ at the outer cylinder contact surface 35. Equation (3) is used to calculate the circumferential stress $\sigma_\theta$ at the outer cylinder contact surface.

$$\sigma_r = \frac{p_c r_c^2}{r_2^2 - r_c^2}\left[1 - \frac{r_2^2}{r_c^2}\right] = -p_c \tag{2}$$

$$\sigma_\theta = \frac{p_c r_c^2}{r_2^2 - r_c^2}\left[1 + \frac{r_2^2}{r_c^2}\right] \tag{3}$$

Where,
$r_1$ is inner cylinder inner radius
$r_{c1}$ is inner cylinder outer radius
$r_2$ is outer cylinder outer radius
$r_{c2}$ is outer cylinder inner radius
$p_c$ is the contact pressure
$r_c$ is the radius at contact surface Similarly Equation (4) is used to calculate the radial stress $\sigma_r$ at the inner cylinder contact surface 34. Equation (5) is used to calculate the circumferential stress $\sigma_\theta$ at the inner cylinder contact surface 34.

$$\sigma_r = \frac{p_c r_c^2}{r_1^2 - r_c^2}\left[1 - \frac{r_1^2}{r_c^2}\right] = -p_s \tag{4}$$

$$\sigma_\theta = \frac{-p_c(r_c^2 + r_1^2)}{(r_c^2 - r_1^2)} \tag{5}$$

The circumferential strain $\varepsilon_\theta$ at the outer cylinder outer wall 36 is:

$$\varepsilon_\theta = \frac{u}{r} = \frac{1}{E}(\sigma_\theta - \vartheta \sigma_r) \tag{6}$$

Expression for outer cylinder radial displacement can be obtained by substituting equations 2 & 3 in equation 6:

$$u_{r2} = \frac{p_c r_c}{E}\left[\frac{r_2^2 + r_s^2}{r_2^2 - r_s^2} + \vartheta\right] \tag{7}$$

Similarly substituting equations 4 & 5 in equation 6 to get the radial displacement at the contact surface of inner cylinder:

$$u_{r1} = \frac{-p_c r_c}{E}\left[\frac{r_2^2 + r_1^2}{r_s^2 - r_1^2} - \vartheta\right] \tag{8}$$

Total interference $\delta = \delta_1 - \delta_2$ \hfill (9)

Where,
$\delta_1$ is radial deformation experienced by inner cylinder 23
$\delta_2$ is radial deformation experienced by outer cylinder 22
Substituting equation 7 & 8 in equation 9

$$\delta = \frac{p_c r_c}{E}\left[\frac{r_2^2 + r_c^2}{r_2^2 - r_c^2} + \frac{r_c^2 + r_1^2}{r_c^2 - r_1^2}\right] \tag{10}$$

Rearranging equation 10 for contact pressure $$p_c = \frac{E\delta}{r_c\left[\frac{r_2^2 + r_c^2}{r_2^2 - r_c^2} + \frac{r_c^2 + r_1^2}{r_c^2 - r_1^2}\right]} \tag{11}$$

Circumferential stress on inner cylinder inner wall 37 is:

$$\sigma_{\theta/r=r1} = \frac{-2 p_c r_c^2}{r_c^2 - r_1^2} \tag{12}$$

Circumferential stress on the outer cylinder inner wall 38 is:

$$\sigma_{\theta/r=rc} = p_c \left[ \frac{r_o^2 + r_c^2}{r_o^2 - r_c^2} \right] \quad (13)$$

Equivalent von-Mises stress expression:

$$\sigma_{VM} = \sqrt{\begin{array}{c} \sigma_{xx} + \sigma_{yy} + \sigma_{zz} - \sigma_{xx} * \sigma_{yy} - \sigma_{yy} * \\ \sigma_{zz} - \sigma_{zz} * \sigma_{xx} + 3(\tau_{xy}^2 + \tau_{yz}^2 + \tau_{zx}^2) \end{array}} \quad (14)$$

Simplifying equation 14 for 2D case ($\sigma_{zz} = \tau_{yz} = \tau_{zx} = 0$)

$$\sigma_{VM} = \sqrt{\sigma_{xx} + \sigma_{yy} - \sigma_{xx} * \sigma_{yy} + 3\tau_{xy}^2} \quad (15)$$

Substitute equations 2, 3, 4, 5, 12 & 13 in equation 14 to calculate the von-Mises stress at the inner wall, contact surface and outer wall of the inner cylinder 23 and the outer cylinder 22.

For thermal shrink fit analysis a similar approach can be used. The contraction ($\delta_1$) of aluminum inner cylinder 23 and expansion of steel outer cylinder 22 ($\delta_2$) is calculated by using equation 16 through thermal loads (temperature difference). So the same press-fit finite element analysis based methodology is used for shrink fit analysis.

$$\delta = \alpha L(\Delta T) \quad (16)$$

Where,
$\delta$=Total deformation.
$\alpha$=Coefficient of thermal expansion.
L=Nominal length of the part being heated.
$\Delta T$=Temperature difference.

Table 1 shows that the stresses calculated using the classical analytical method yield nearly identical values to the stresses produced using the finite element analysis based simulation.

TABLE 1

| Location | Stress-Classical Analytical Method (MPa) | Stress-FEA (MPa) |
|---|---|---|
| Inner Cylinder Inner Wall 37 | 174.1 | 174.0 |
| Inner Cylinder Outer Wall 39 | 102.6 | 102.5 |
| Outer Cylinder Inner Wall 38 | 141.8 | 141.8 |
| Outer Cylinder Outer Wall 36 | 49.7 | 49.7 |

At FIG. 3, box 114, is "wherein: the first material is bonded to the second material by an adhesive disposed between the first material and the second material, thereby forming the joint; and the joint is an adhesively bonded joint." In FIG. 3, the flowchart connector B indicates the connection between box 114 and box 115 shown in FIG. 4. In FIG. 3, a flowchart connector D indicates a connection between box 112 and box 142 shown in FIG. 6. In FIG. 3, a flowchart connector E indicates a connection between box 112 and box 143 shown in FIG. 7.

In FIG. 4, the flowchart connector B indicates the connection between box 114 shown in FIG. 3 and box 115. In box 115, FIG. 4 depicts "wherein: a cohesive zone method is applied to model cohesive zone elements of the adhesively bonded joint; and a finite element method algorithm including a cohesive zone module calculates stresses and strains under internal and external loads."

Figure 15:
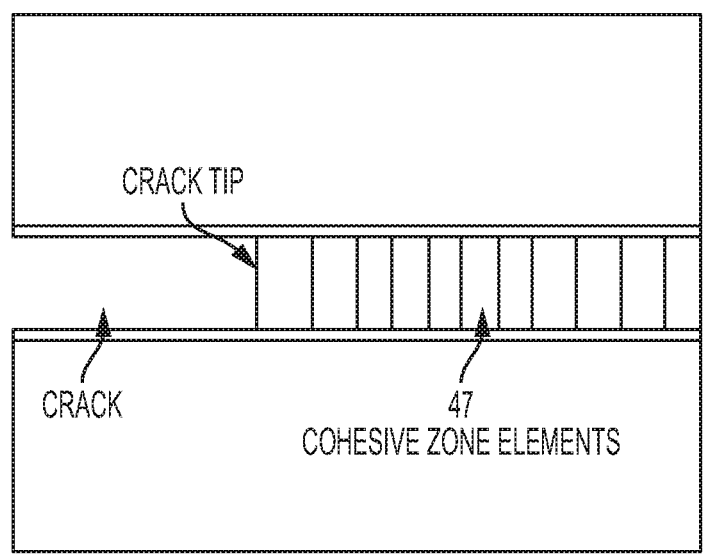
FIG. 15 is a schematic diagram depicting examples of cohesive zone elements according to the present disclosure.

As disclosed herein, examples of the cohesive zone method are numerical methods for modeling fracture. Examples of the cohesive zone method include assigning a characteristic traction-separation law to a special embedded set of finite elements in the finite element analysis based simulation. FIG. 15 depicts an arrangement of cohesive zone elements 47. Cohesive zone elements 47 act as potential fracture planes having an opening stress profile, i.e. the stress as a function of the crack face separation, governed by one or more traction-separation laws.

The cohesive zone method applies a combination of fracture theories (Griffith energy based approach (Linear Elastic Fracture Mechanics) and Inglis strength based approach) based on strength and energy via the characteristic traction-separation laws. Yang et al. (Mixed-mode fracture analyses of plastically-deforming adhesive joints Q D Yang, M D Thouless, International Journal of Fracture 110 (2), 175-187) developed user-defined elements, which provide a means of modeling 2-D mixed mode fracture by defining a traction-separation law for each fracture mode. As the geometry is loaded, the crack plane faces separate and each cohesive element applies traction to the interface planes according to its traction-separation laws. Equation 17 presents the empirical failure criterion for cohesive elements:

$$\frac{\mathcal{G}_I}{\Gamma_I} + \frac{\mathcal{G}_{II}}{\Gamma_{II}} = 1 \quad (17)$$

Figure 16:
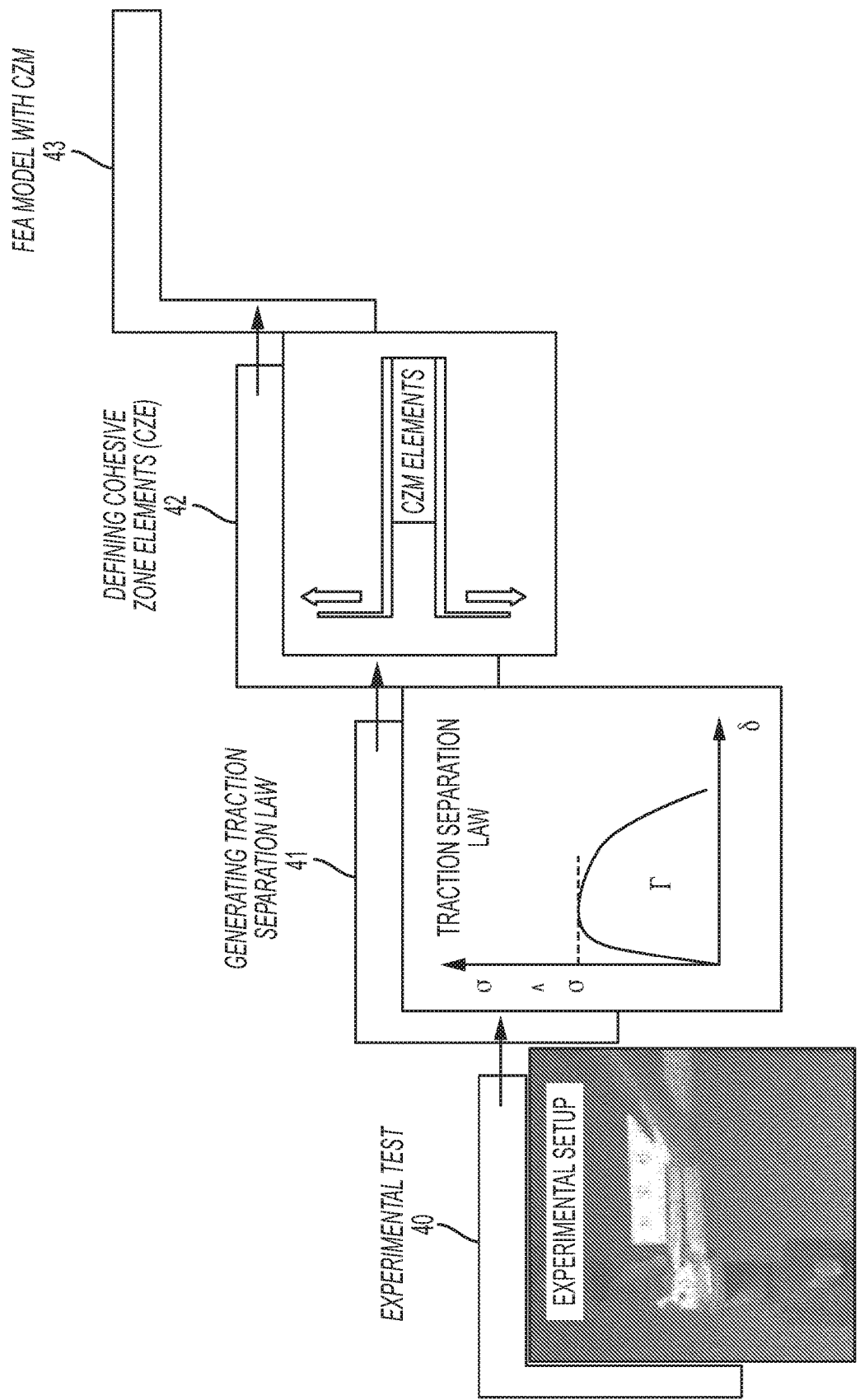
FIG. 16 is a schematic diagram depicting examples of steps in the cohesive zone method as disclosed herein.

$\mathcal{G}$—Strain energy release rate
$\Gamma$—Toughness
Subscripts: I—Mode I; II—Mode II FIG. 16 depicts examples of steps in the cohesive zone method as disclosed herein. In FIG. 16, the steps are: Experimental test 40; Generating traction separation law 41; Defining cohesive zone elements 42; and Finite Element Analysis (FEA) model with Cohesive Zone Model (CZM) 43. In FIG. 4, at box 116, is "wherein the cohesive zone method includes: determining traction-separation laws for a mode I crack separation and a mode II crack separation of the first material and the second material bonded by the adhesive; defining the cohesive zone elements in a finite element model, wherein defining the cohesive zone elements includes generating a mesh for the cohesive zone elements and applying the traction-separation laws as elemental properties of the cohesive zone elements; and executing the finite element method algorithm including the cohesive zone module." In FIG. 4, the flowchart connector C indicates a connection between box 116 and box 117 shown in FIG. 5.

Figure 17:
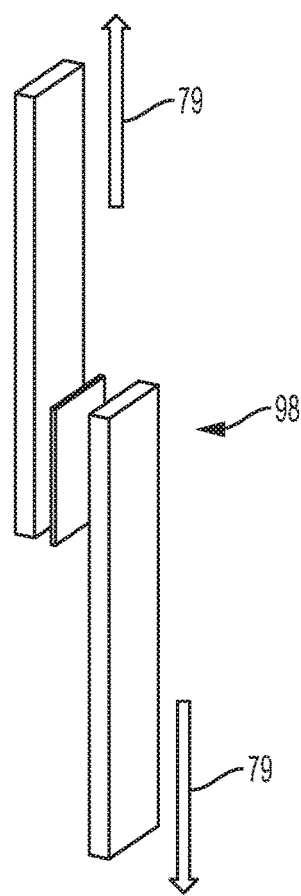
FIG. 17 is a schematic illustration of a test setup for a Lap-Shear Test (Mode II)
Figure 18:
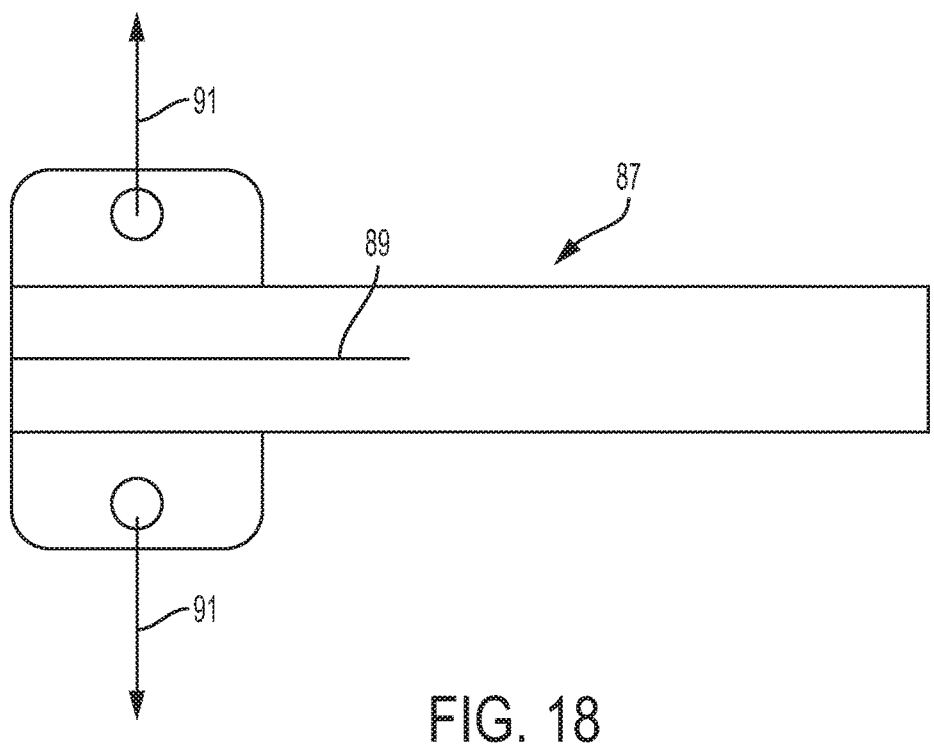
FIG. 18 is a schematic illustration of a test setup for a double cantilever beam test (Mode I)

The traction-separation laws are generated based on coupon level tests with respect to crack separation modes (e.g., mode I and mode II). The traction-separation laws are used as an elemental property for cohesive zone elements to predict the behavior of the various geometries. In FIG. 5, the flowchart connector C indicates the connection between box 117 and box 116 shown in FIG. 4. In box 117, FIG. 5 depicts "wherein the determining traction-separation laws includes empirically determining the traction-separation laws from a double cantilever beam test to determine the traction-separation law for the mode I crack separation and a lap shear test to determine the traction-separation law for the mode II crack separation." FIG. 17 illustrates a test setup for a Lap-Shear Test (Mode II). An adhesive lap joint specimen 98 is placed in tensile shear as indicated by the Mode II load arrows 79. FIG. 18 illustrates a test setup for a double cantilever beam test (Mode I). A double cantilever beam specimen 87 has a pre-crack 89 and is loaded as shown at Mode I load arrows 91. At box 118, FIG. 5 depicts "wherein:

the double cantilever beam test method is defined by ASTM D5528; and the lap shear test method is defined by ASTM D5868."Note that the American Society for Testing and Materials (ASTM) changed its name to "ASTM International" in 2001.

In FIG. 6, the flowchart connector D indicates the connection between box 112 shown in FIG. 3 and box 142. In box 142, FIG. 6 depicts "wherein varying the topology optimization parameters includes: determining an elemental density for each element of the finite element model; determining a minimum density threshold based on a weight savings percentage target and a mapping of the elemental density on the finite element model; setting the elemental density to zero for each of the elements of the finite element model having an elemental density less than the minimum density threshold; and assigning the elemental density to 1 for each of the elements of the finite element model having an elemental density greater than or equal to the minimum density threshold; and varying the topology optimization parameters in the elements of the finite element model having the elemental density assigned to 1."

Figure 7:
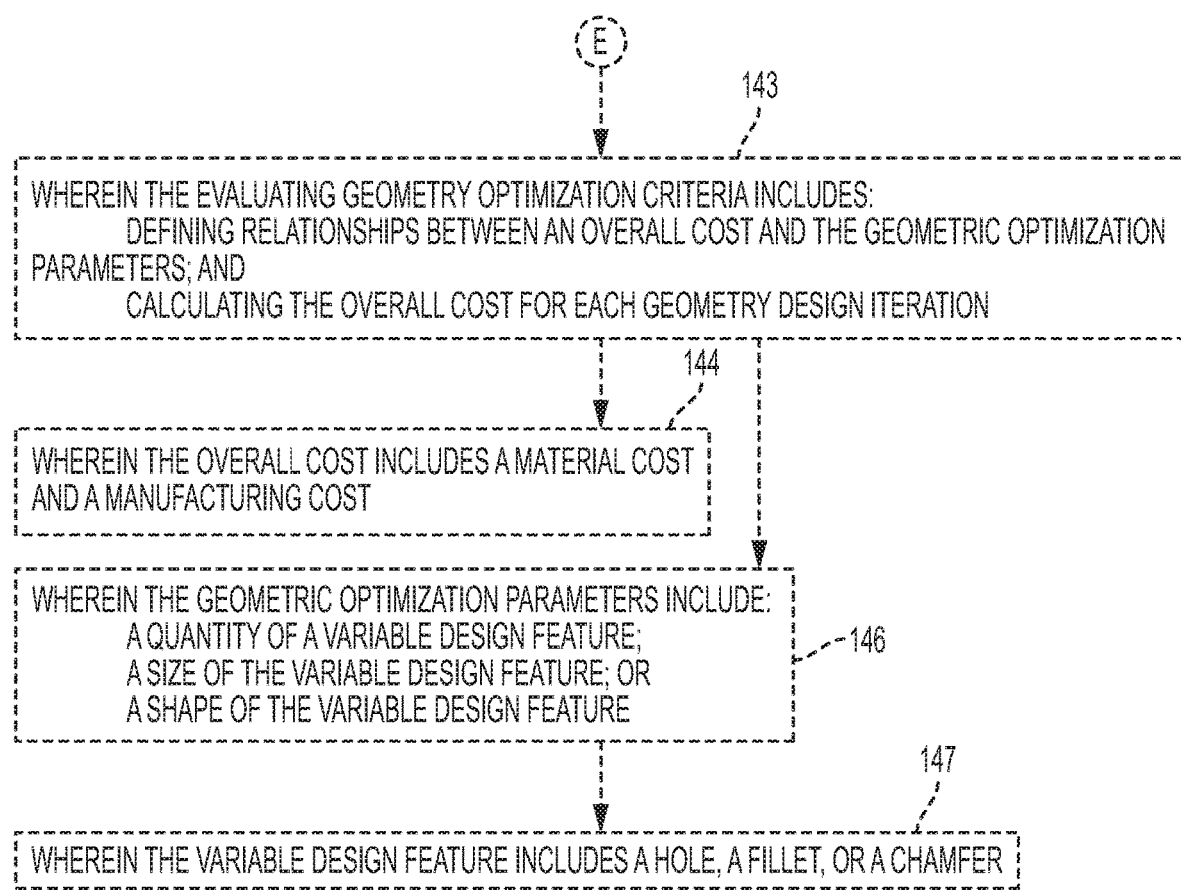

In FIG. 7, the flowchart connector E indicates the connection between box 112 shown in FIG. 3 and box 143. In box 143, FIG. 7 depicts "wherein the evaluating geometry optimization criteria includes: defining relationships between an overall cost and the geometric optimization parameters; and calculating the overall cost for each geometry design iteration." At box 144, is "wherein the overall cost includes a material cost and a manufacturing cost." At box 146, is "wherein the geometric optimization parameters include: a quantity of a variable design feature; a size of the variable design feature; or a shape of the variable design feature." At box 147, FIG. 7 depicts "wherein the variable design feature includes a hole, a fillet, or a chamfer."

As disclosed herein, topology optimization would have utility at the concept level of the design cycle to arrive at a conceptual design which meets the overall performance and manufacturability. Identifying the design and non-design space is one of the first steps of the topology optimization.

Figure 19:
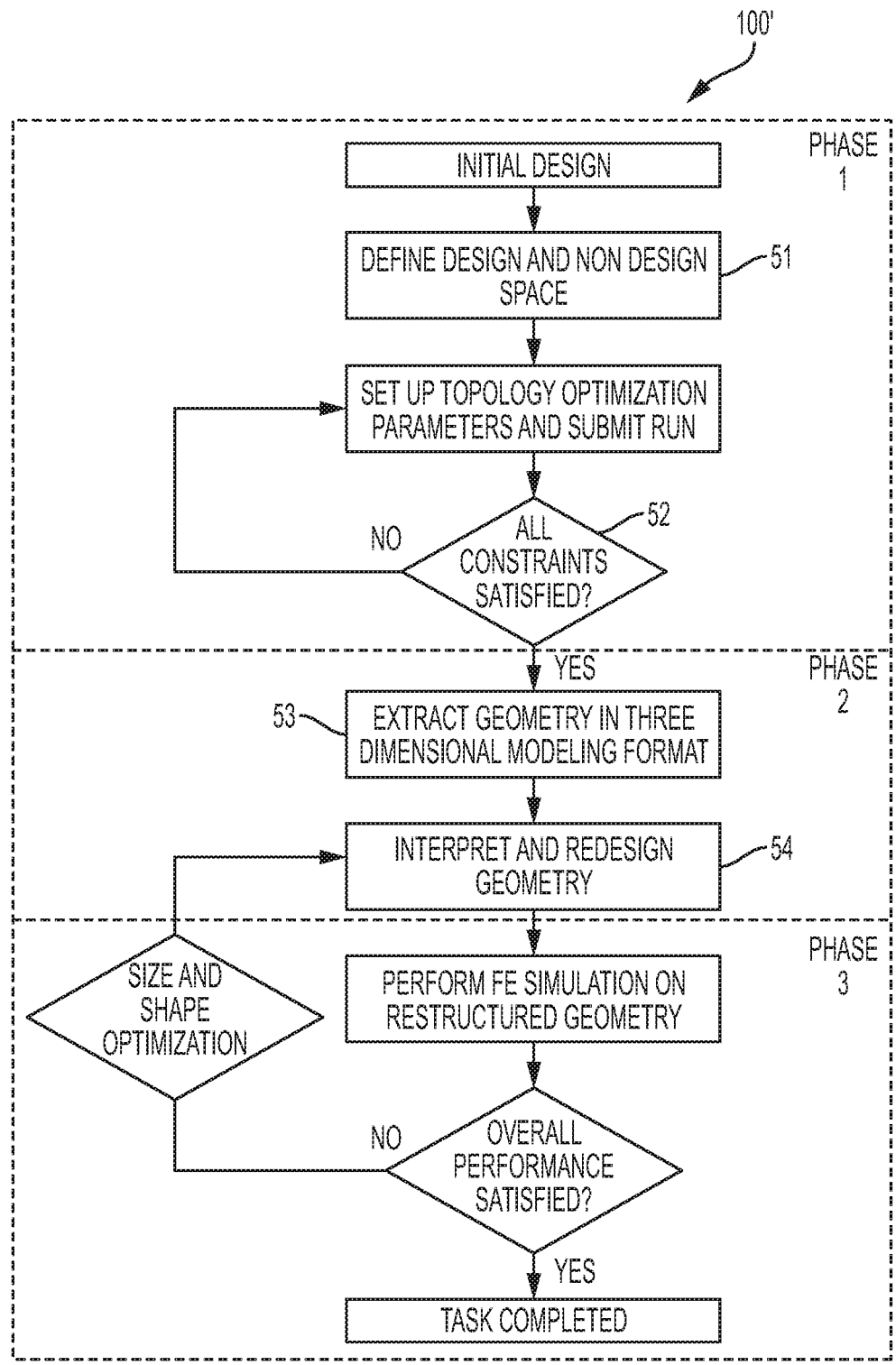
FIG. 19 is a flow chart representing a method that combines topology optimization with shape and size optimization as disclosed herein.

FIG. 19 is a flow chart representing a method 100' that combines topology optimization with shape and size optimization as disclosed herein. The work flow of topology optimization with shape and size optimization is divided in three phases. Phase 1 includes the design and non-design space segregation shown at box 51, and optimization problem formulation through evaluation of results shown at reference numeral 52. Phase 2 includes extracting the geometry from the Phase 1 optimization results at box 53 and interpreting and redesigning to obtain a realistic geometry at box 54. Phase 3 includes iteratively performing Finite Element simulation to optimize and validate the redesigned geometry.

Figure 20:
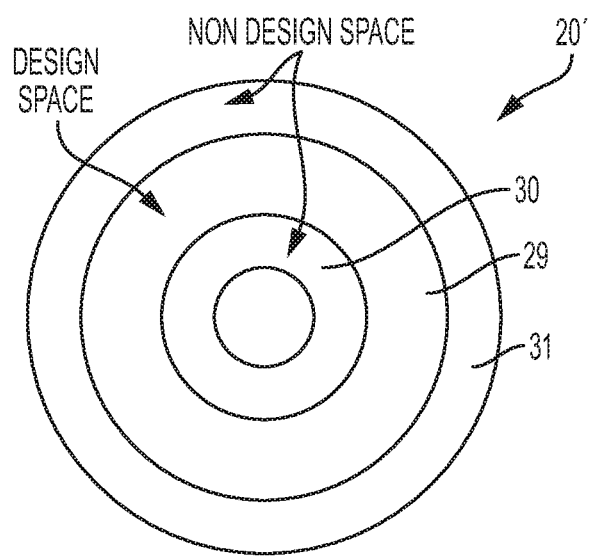
FIG. 20 is a cross-sectional view of a 3 layer multilayer tube.

FIG. 20 is a cross-sectional view of a multilayer tube 20' presented herein to illustrate a second example of the method of the present disclosure. The multilayer tube 20' includes three tubular elements joined together using any suitable joining technique including a mechanical interference based joining technique or an adhesive bonding technique. FIG. 20 illustrates the defining of the design and the non-design space. In the example depicted in FIG. 20, the design space 29 is the middle layer, between the outer layer 31 and the inner layer 30. The outer layer 31 and the inner layer 30 are "non-design space" as indicated in FIG. 20. The design space 29 incorporates a lighter material from the first example of joining techniques described herein above. The design space 29 was iteratively changed in a computer simulator to find the optimized design. HyperMesh and OptiStruct v. 12.0 were used for the Finite Element Model setup, optimization formulation and performing optimization runs. HyperView v. 12.0 was used to post process the results.

The second example, referred to above, is an example that applies the method of the present disclosure in the formulation stated as follows:

Objective: Maximize stiffness of the structure (minimize compliance), where the structure is the multilayer tube 20'.

Constraints: Stress value, volume fraction and manufacturing (extrusion method)

Design variables: Element density

In the second example, optimization runs were performed with objective function of minimizing the weight within the following criteria: (1) stiffness, (2) design space, (3) stress/deformation, and (4) manufacturing constraints. Since the initial results of topology optimization may not have been realistic, multiple iterations were applied for the topology optimization to convergence with practical results. Next, size and shape optimization was used to fine tune the results from topology optimization with the objective function to meet the overall performance objectives.

A Finite Element Analysis computer simulation was run on the design space 29 to determine which of the elements (finite elements) were load bearing elements. The computer simulator produced a graphical display, depicting elements with an elemental density of 1 in a red color to indicate that such elements were load-bearing elements. As used herein, elemental density means a number of finite elements in a particular space. When a finite element mesh is generated, areas with higher loading are given smaller elements to improve the model without adding calculation burden for areas that are lightly loaded. The graphical display depicted elements with elemental density of 0 as blue elements to indicate that such blue elements were non-load bearing elements that could be neglected. Thus, an understanding of the structurally important areas was gained. Since the red and blue color would not reproduce in black and white, a depiction of the graphical display has been omitted.

Figure 21:
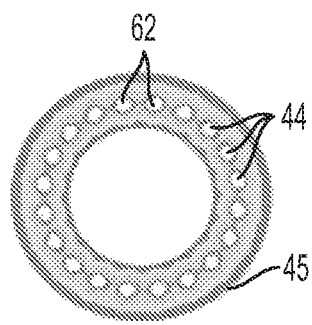
FIG. 21 is a grayscale contour plot of a finite element model depicting void or hole locations that influence elemental density.

Based on a weight savings constraint and the element density plots, an elemental density threshold was set. Elements with an elemental density value below the elemental density threshold were neglected; hence a contribution of the neglected elements to the overall stiffness of the structure was also nullified. FIG. 21 depicts a cross-sectional view of a finite element model depicting the neglected elements 44 as white. Darker colors in FIG. 21 indicate load bearing elements 45. To counterbalance the removal of the neglected elements 44 from the analysis, all elements with densities greater than the threshold were assigned a new standardized density value 1, which implies that the stiffness of the remaining elements was equally increased.

Next, the geometry of the second example was refined considering manufacturing constraints. The manufacturing constraints considered were manufacturing limits on minimum thickness and machining cost. The neglected elements 44 in the topology optimization suggested a number of holes 62, voids, or slots as shown in FIG. 21. The number of holes 62 (i.e., 20 holes in FIG. 21) may have been manufacturable; however there was an opportunity for cost improvement since the metal extrusion process required a mandrel for each hole 62 shown to get the desired shape. There was an opportunity to optimize weight and cost by reducing the number of holes 62 and the web thickness within the stress constraint.

Figure 22:
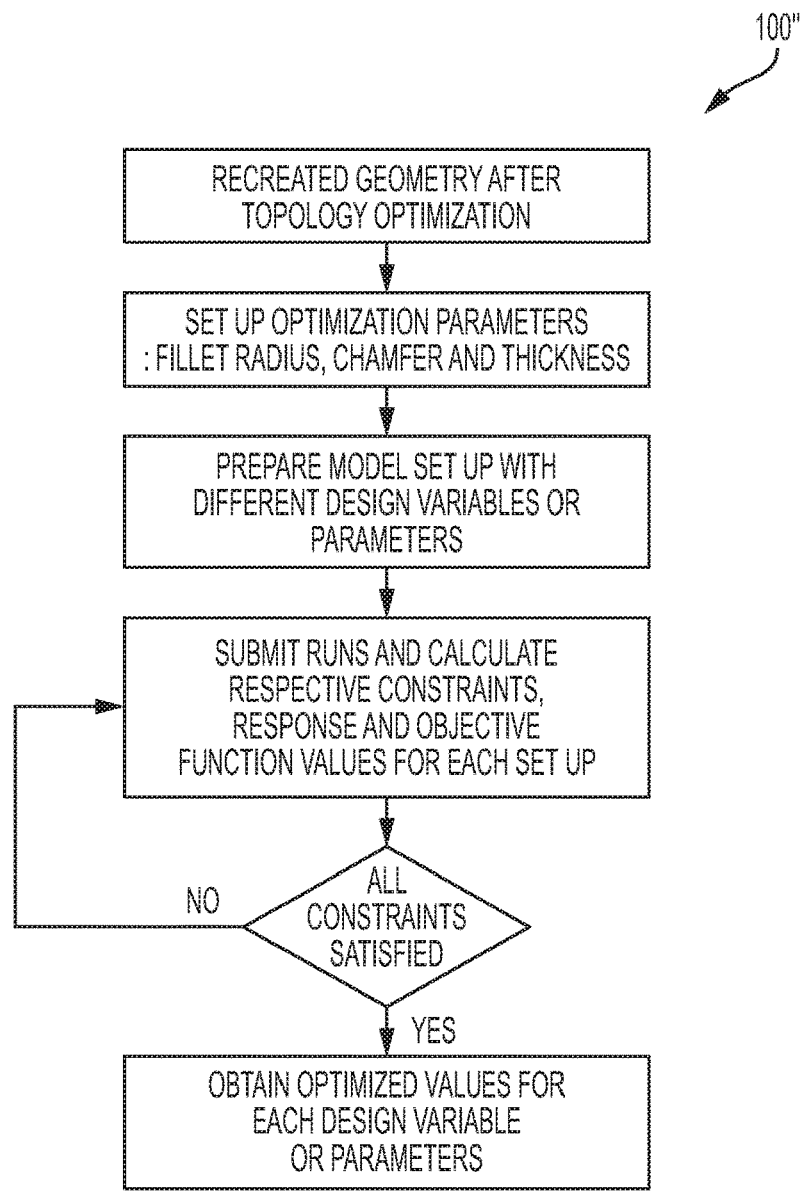
FIG. 22 is a flow chart depicting a work flow of a size and shape optimization process.

The methodology of parametric design optimization or size and shape optimization was used to further fine tune the geometry. FIG. 22 is a flow chart depicting a work flow of a size and shape optimization process 100". This approach is similar to the parametric method where the predefined design variables include a hole, a fillet, or a chamfer. Therefore design variables can be determined through a relationship between geometric dimensions and the design variables. During each iteration, the design variables were modified and the geometric model was modified accordingly. The mesh was automatically updated in the Finite Element Model.

Figure 23:
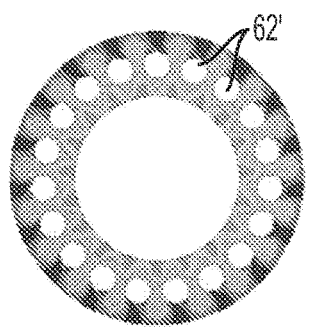
FIG. 23 is a grayscale contour plot of a finite element model depicting the results of the second example after the geometry was refined considering manufacturing constraints and applying the size and shape optimization process according to the present disclosure.

After multiple iterations, the objective function was met and all constraints satisfied. FIG. 23 is a grayscale contour plot of a finite element model depicting the results of the second example after the geometry was refined considering manufacturing constraints and applying the size and shape optimization process 100". The cross-section shown in FIG. 23 is lighter and less costly to manufacture than the cross-section shown in FIG. 21. In FIG. 21, there are 20 holes 62. In FIG. 23, there are 19 holes 62'. Manufacturing fewer holes 62, 62' translates to lower tooling costs for mandrels. The holes 62' in FIG. 23 are larger than the holes 62 in FIG. 21, therefore, a weight savings was realized in the design depicted in FIG. 23 compared to the design depicted in FIG. 21. The lighter, less costly design depicted in FIG. 23 met the performance objectives (i.e. stiffness, design space, stress/deformation) within the manufacturing constraints.

In an example of the present disclosure depicted in FIG. 24A, a gear 10 for transmitting torque includes a steel toothed annular flange 12 having gear teeth 14 defined on a periphery 15 of the steel toothed annular flange 12. The whole steel toothed annular flange 12 is steel. The gear teeth 14 are steel, and the flange that supports the gear teeth 14 is steel. The gear teeth 14 on the steel toothed annular flange 12 may be any type of gear tooth 14 that is capable of meeting the loading requirements of the gear 10. For example, the gear 10 may have spur gear teeth, helical gear teeth, or double helical gear teeth.

A steel hub 11 is coaxially aligned with the steel toothed annular flange 12. A web 13 is formed from a web material 16 having a density less than or equal to 3.0 grams per cubic centimeter (g/cm$^3$). For example the web material 16 may be aluminum, an aluminum alloy, a fiber reinforced polymer composite, or combinations thereof. The web 13 may have a uniform web thickness 17 except in locations on the web 13 where lightening apertures 18 are defined in the web 13.

The inventors of the present disclosure have fortuitously and unexpectedly discovered that the optimum total quantity of the lightening apertures 18 may depend on the web material 16. For example, the optimum total quantity of the lightening apertures 18 is seven when the web material is aluminum or an aluminum alloy; and the optimum total quantity of the lightening apertures 18 is thirteen when the web material is a fiber reinforced polymer composite. In this case, the optimization included weight reduction of the gear.

Figure 28:
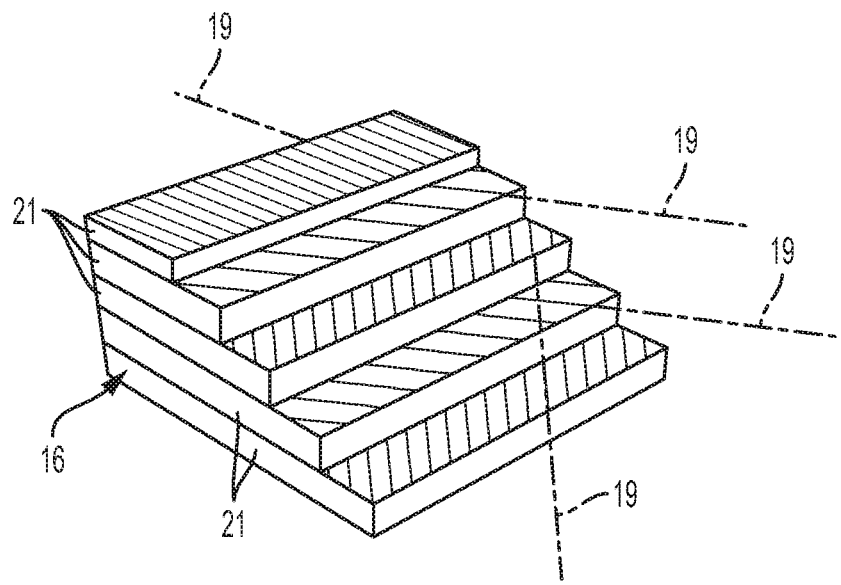
FIG. 28 is a schematic perspective view depicting an example of web material having a plurality of layers of fiberglass reinforcement according to the present disclosure.

In examples that have the fiber reinforced polymer composite web material, the web material 16 may be reinforced with glass fiber, carbon fiber, or combinations thereof. As depicted in FIG. 28, the web material 16 may have a plurality of layers 21 of fiberglass reinforcement. Each layer 21 can include fibers aligned parallel to a layer fiber alignment axis 19 of each layer 21. The layer fiber alignment axis 19 of each layer 21 can be skewed with an adjacent layer fiber alignment axis of an adjacent layer. In this way, the physical properties of the web 13 are isotropic from a macroscopic perspective.

Figure 27:
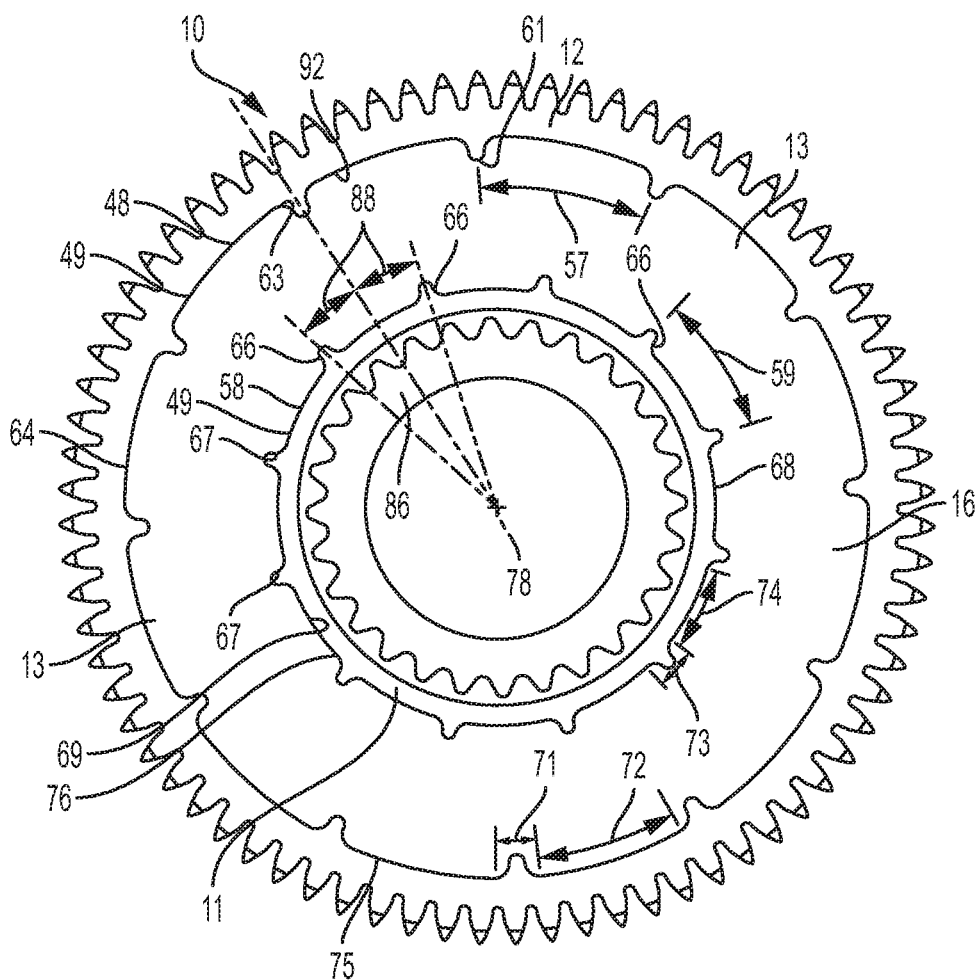
FIG. 27 is a semi-schematic front view depicting an example of a gear with solid fiberglass reinforced polymer composite web according to the present disclosure.

In an example of the present disclosure depicted in FIG. 27, the web 13 is fixedly attached to the steel toothed annular flange 12 and to the steel hub 11 so the gear 10 rotates as a solid body. In other words the steel toothed annular flange 12, the web 13, and the steel hub 11 rotate together, substantially without relative motion. "Substantially without relative motion" in the previous sentence means any relative motion would not be visible to the naked eye during operation of the gear 10. Because the materials of the steel toothed annular flange 12, the web 13, and the steel hub 11 have different elastic properties and thermal responses, the parts (i.e. the steel toothed annular flange 12, the web 13, and the steel hub 11) may experience a small amount of relative motion that would only be detectable with sensitive instrumentation. The gear 10 is to operatively transmit a torque of at least 500 Newton Meters (N·m) for at least 6 million revolutions of the gear 10. An overall mass of the gear 10 is less than two-thirds of an overall mass of a same-sized all steel gear having a solid steel web with a solid steel web thickness 17 at least one-third of a face width 46 (see FIG. 24B) of the steel toothed annular flange 12.

In examples of the present disclosure, the web 13 may be bonded to the steel toothed annular flange 12 with a first layer 48 of an adhesive 49. The web 13 may be bonded to the steel hub 11 with a second layer 58 of the adhesive 49. In examples, the first layer 48 of the adhesive 49 and the second layer 58 of the adhesive 49 may be about 0.25 mm thick.

In other examples, the web 13 may be retained in the steel toothed annular flange 12 by a first mechanical interference joint 55 (see, e.g. FIG. 24A) between the steel toothed annular flange 12 and the web 13. The steel hub 11 may be retained in the web 13 by a second mechanical interference joint 56 (see, e.g. FIG. 24A) between the web 13 and the steel hub 11. As stated above, in examples of the present disclosure, mechanical interference joints 55, 56 can include a thermal shrink-fit joint and/or a mechanical press-fit joint.

In the example depicted in FIG. 27, a plurality of first lugs 61 is defined at first spaced intervals 57 on an interior surface 92 of the steel toothed annular flange 12. A plurality of first grooves 63 is defined in an outer web circumferential surface 64. The plurality of first grooves 63 is complementary to the plurality of first lugs 61. A total quantity of the first grooves 63 is at least equal to a total quantity of the first lugs 61. In the example depicted in FIG. 27, the total quantity of the first grooves 63 is equal to the total quantity of the first lugs 61. In the example depicted in FIG. 27, the total quantity of the first grooves 63 is 12. A plurality of second lugs 66 is defined at second spaced intervals 59 on an exterior surface 68 of the steel hub 11. A plurality of second grooves 67 is defined in an inner web circumferential surface 69. The plurality of the second grooves 67 is complementary to the plurality of the second lugs 66. A total quantity of the second grooves 67 is at least equal to a total quantity of the second lugs 66. In the example depicted in FIG. 27, the total quantity of the second grooves 67 is equal to the total quantity of the second lugs 66. In the example depicted in FIG. 27, the total quantity of the second grooves 67 is 12.

A first ratio of a first lug arc length 71 to a first inter-lug space arc length 72 may be equal to a first strength ratio of a shear strength of the web material 16 to a shear strength of the steel in the steel toothed annular flange 12. A second ratio of a second lug arc length 73 to a second inter-lug space arc length 74 may be equal to a second strength ratio of the shear strength of the web material 16 to a shear strength of the steel in the steel hub 11. The first lug arc length 71 and the first inter-lug space arc length 72 are determined at a first root circle 75 of the plurality of the first lugs 61. The second lug arc length 73 and the second inter-lug space arc length 74 are determined at a second root circle 76 of the plurality of the second lugs 66.

Experimental Test Results

Gears are subjected to an array of design verification tests to assure a new gear design meets or exceeds design requirements. Actual hardware tests, not computer simulations, were used to compare gears 10 that were designed using the structural optimization method 50 to gears that were designed using more conventional existing engineering methods. The tests results summarized below show that all of the attempts to design lightweight, high-torque gears with conventional techniques resulted in gears that could not meet the design validation test requirements. As disclosed herein, only the gears designed by the method of the present disclosure were able to meet all of the design validation test targets including thermal range, impact loading, and fatigue durability. In testing on test stands the gear designs that used classical Euler theory techniques of design such as the "Shrink Fit"-based design shown in FIG. 25 and FIG. 26 all failed to meet at least one of the design validation test requirements. In sharp contrast, all samples of all gears 10 designed using the method of the present disclosure passed 100% of the design validation testing while achieving a lightweighting capability of one-third reduction of mass compared to the current all-steel gear designs.

Conventional Example A

A representative sample of conventional example A is shown in FIG. 25. The gear assembly has a toothed ring gear 81, an aluminum core 82, and a steel hub 83 assembled using a light shrink fit to form a mechanical interference joint. A light shrink fit is a thermal shrink fit that establishes a light drive fit according to ANSI B 4.1. Conventional Example A relied on residual stresses at the shrink fit joint to hold the parts of the assembly together. Conventional Example A experienced a loosening of the first mechanical interference joint 55 during a thermal shake test. The temperature range for the thermal shake test was from −50 degrees Fahrenheit (° F.) to 350° F. with a maximum acceleration in the thermal chamber being 50 g (g is the standard value of gravitational acceleration at sea level on Earth).

Conventional Example B

A representative sample of conventional example B is also shown in FIG. 25. The gear assembly has a toothed ring gear 81, an aluminum core 82, and a steel hub 83 assembled using a medium shrink fit to form the mechanical interference joints. A medium shrink fit is a thermal shrink fit that establishes a medium drive fit according to ANSI B 4.1. Conventional Example B experienced a loosening of the first mechanical interference joint 55 during the thermal shake test.

Conventional Example C

A representative sample of conventional example C is shown in FIG. 26. The gear assembly has a toothed ring gear 81', an aluminum core 82', and a steel hub 83' assembled using a heavy shrink fit to form the mechanical interference joints. A heavy shrink fit is a thermal shrink fit that establishes a heavy drive fit according to ANSI B 4.1. Conventional Example C had an oval aluminum core 82'. The steel toothed ring gear 81' and the steel hub 83' had corresponding oval shapes to complement the aluminum core 82'. Since the toothed surface of the toothed ring gear 81' is round, the ovality caused a thinner area 84 of the toothed ring gear 81'. The toothed ring gear 81' cracked (at the thinner area 84) early in torque cycle testing. The torque cycle testing included 10 million cycles on a torque test fixture at 4500 ft-lbs (foot pounds). The crack occurred at the thinnest area of the toothed ring gear 81'. No other testing was performed on the Conventional Example C.

Example D

A representative sample of example D (according to an example of the present disclosure) is shown in FIG. 27. The gear 10 has a steel toothed annular flange 12 having gear teeth 14 defined on a periphery 15 of the steel toothed annular flange 12. The gear teeth 14 on the steel toothed annular flange 12 are spur gear teeth with an involute profile. A steel hub 11 is coaxially aligned with the steel toothed annular flange 12. A web 13 is formed from a fiberglass reinforced polymer composite 77 that has a uniform web thickness 17 (see, e.g., FIG. 24B) of about 27 mm. The web 13 is adhesively bonded to the steel toothed annular flange 12 and to the steel hub 11 with epoxy. A centering fixture based on concentric arbor-expanders was used to control runout during assembly. Runout was less than 0.005 mm with no need for final grinding of the gear teeth 14. The steel toothed annular flange 12 has 12 equally spaced first lugs 61. The steel hub 11 has 12 equally spaced second lugs 66. The first lugs 61 are each centered at angles 88 that bisect circular sectors 86 defined by each adjacent pair of second lugs 66 and the center axis 78 of the gear 10.

Example D was designed using the method 100 of the present disclosure including the cohesive zone method. Example D met all of the design verification test requirements. The Example D test specimens passed the thermal shake test that conventional example A and conventional example B could not pass. The Example D test specimens passed the torque cycle tests that conventional example C could not pass. Further, Example D passed a 90,000 cycle impact test in an Eaton Fuller transmission. During static torque load tests, Example D reached higher static torque loadings than the production steel gear that Example D was designed to replace. When an Eaton Fuller FRO-16210C transmission was tested for Noise Vibration and Harshness (NVH) with and without one Example D gear installed as a mainshaft gear, the drive-by sound intensity was reduced overall by 3 dB, and for many loud frequencies by 5 dB.

It is to be understood that the terms "connect/connected/ connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Further, it is to be understood that when "about" is utilized to describe a value, this is meant to encompass minor variations (+/−10% from the stated value (e.g., about 0.025 inch is 0.023 inch to 0.027 inch)).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A gear for transmitting torque, comprising:
a steel toothed annular flange having gear teeth defined on a periphery thereof;
a steel hub coaxially aligned with the steel toothed annular flange; and
a web formed from a web material having a density less than or equal to 3.0 grams per cubic centimeter (g/cm$^3$), the web fixedly attached to the steel toothed annular flange and to the steel hub for rotation therewith, wherein the gear is to operatively transmit a torque of at least 500 Newton Meters (Nm) for at least 6 million revolutions of the gear;
wherein an overall mass of the gear is less than two-thirds of an overall mass of a same-sized all steel gear having a solid steel web with a solid steel web thickness at least one-third of a face width of the steel toothed annular flange; wherein:
the web material is a fiber reinforced polymer composite;
the web material is reinforced with glass fiber, carbon fiber, or combinations thereof;
the web material includes a plurality of layers of fiberglass reinforcement;
each layer includes fibers aligned parallel to a layer fiber alignment axis of each layer; and
the layer fiber alignment axis of each layer is skewed with an adjacent layer fiber alignment axis of an adjacent layer.

2. The gear as defined in claim 1 wherein:
the web is bonded to the steel toothed annular flange with a first layer of an adhesive; and
the web is bonded to the steel hub with a second layer of the adhesive.

3. The gear as defined in claim 1 wherein:
the web is retained in the steel toothed annular flange by a first mechanical interference joint between the steel toothed annular flange and the web; and
the steel hub is retained in the web by a second mechanical interference joint between the web and the steel hub.

4. The gear as defined in claim 1, further comprising:
a plurality of first lugs defined at spaced intervals on an interior surface of the steel toothed annular flange;
a plurality of first grooves defined in an outer web circumferential surface wherein the plurality of the first grooves is complementary to the plurality of the first lugs, and wherein a total quantity of the first grooves is at least equal to a total quantity of the first lugs;
a plurality of second lugs defined at spaced intervals on an exterior surface of the steel hub; and
a plurality of second grooves defined in an inner web circumferential surface wherein the plurality of second grooves is complementary to the plurality of the second lugs, and wherein a total quantity of second grooves is at least equal to a total quantity of the second lugs.

5. The gear as defined in claim 4 wherein:
a first ratio of a first lug arc length to a first inter-lug space arc length is equal to a first strength ratio of a shear strength of the web material to a shear strength of the steel in the steel toothed annular flange;
a second ratio of a second lug arc length to a second inter-lug space arc length is equal to a second strength ratio of the shear strength of the web material to a shear strength of the steel in the steel hub;
the first lug arc length and the first inter-lug space arc length are determined at a first root circle of the plurality of the first lugs; and
the second lug arc length and the second inter-lug space arc length are determined at a second root circle of the plurality of the second lugs.

6. The gear as defined in claim 1 wherein the web has a uniform web thickness.

7. The gear as defined in claim 1 wherein a plurality of lightening apertures are defined in the web, and the web has a uniform web thickness except in locations on the web where each of the lightening apertures is defined in the web.

8. The gear as defined in claim 7 wherein
the total quantity of the lightening apertures is thirteen.

9. A computer implemented method for designing a gear for transmitting torque, the method comprising:
inputting a finite element model of an initial structural design via a user interface;
defining design and non-design space on the initial structural design;
setting up topology optimization parameters;
iteratively optimizing topology variations from the initial structural design by varying the topology optimization parameters in a computer simulator running a computer simulation until topology optimization criteria are satisfied to generate a topology optimized design;
storing the topology optimized design in a first three dimensional modeling format;
iteratively optimizing geometry variations from the topology optimized design by varying geometric optimization parameters of each geometry design iteration in the computer simulator running the computer simulation and evaluating geometry optimization criteria until geometry optimization targets are satisfied to generate a geometry optimized design;
storing the geometry optimized design in a second three dimensional modeling format; and
generating a hardware prototype according to the geometry optimized design, wherein the gear for transmitting torque includes:
a steel toothed annular flange having gear teeth defined on a periphery thereof;
a steel hub coaxially aligned with the steel toothed annular flange; and
a web formed from a web material having a density less than or equal to 3.0 grams per cubic centimeter (g/cm3), the web fixedly attached to the steel toothed annular flange and to the steel hub for rotation therewith, wherein the gear is to operatively transmit a torque of at least 500 Newton Meters (Nm) for at least 6 million revolutions of the gear;
wherein an overall mass of the gear is less than two-thirds of an overall mass of a same-sized all steel gear having a solid steel web with a solid steel web thickness at least one-third of a face width of the steel toothed annular flange; wherein:
the web material is a fiber reinforced polymer composite;
the web material is reinforced with glass fiber, carbon fiber, or combinations thereof;
the web material includes a plurality of layers of fiberglass reinforcement;
each layer includes fibers aligned parallel to a layer fiber alignment axis of each layer; and
the layer fiber alignment axis of each layer is skewed with an adjacent layer fiber alignment axis of an adjacent layer.

10. The method as defined in claim 9 wherein:
the initial structural design includes a first material and a second material;
the first material and the second material are dissimilar; and
the first material is joined to the second material thereby forming a joint, wherein the first material is steel.

11. The method as defined in claim 10 wherein:
the joint is a mechanical interference-based joint; and
the computer simulation includes:
an Augmented Lagrangian contact algorithm to define a frictional contact between the first material and the second material at the interference-based joint; and
a finite element method algorithm to calculate stresses and strains under internal and external loads.

12. The method as defined in claim 10 wherein:
the first material is bonded to the second material by an adhesive disposed between the first material and the second material, thereby forming the joint; and
the joint is an adhesively bonded joint.

13. The method as defined in claim 12 wherein:
a cohesive zone method is applied to model cohesive zone elements of the adhesively bonded joint; and
a finite element method algorithm including a cohesive zone module calculates stresses and strains under internal and external loads.

14. The method as defined in claim 13 wherein the cohesive zone method includes:
determining traction-separation laws for a mode I crack separation and a mode II crack separation of the first material and the second material bonded by the adhesive;
defining the cohesive zone elements in a finite element model, wherein defining the cohesive zone elements includes generating a mesh for the cohesive zone elements and applying the traction-separation laws as elemental properties of the cohesive zone elements; and
executing the finite element method algorithm including the cohesive zone module.

15. The method as defined in claim 14 wherein the determining traction-separation laws includes empirically determining the traction-separation laws from a double cantilever beam test to determine the traction-separation law for the mode I crack separation and a lap shear test to determine the traction-separation law for the mode II crack separation.

16. The method as defined in claim 10 wherein varying the topology optimization parameters includes:
determining an elemental density for each element of the finite element model;
determining a minimum density threshold based on a weight savings percentage target and a mapping of the elemental density on the finite element model;
setting the elemental density to zero for each of the elements of the finite element model having an elemental density less than the minimum density threshold; and
assigning the elemental density to 1 for each of the elements of the finite element model having an elemental density greater than or equal to the minimum density threshold; and
varying the topology optimization parameters in the elements of the finite element model having the elemental density assigned to 1.

17. The method as defined in claim 10 wherein:
the evaluating geometry optimization criteria includes:
defining relationships between an overall cost and the geometric optimization parameters; and
calculating the overall cost for each geometry design iteration;
the overall cost includes a material cost and a manufacturing cost;
the geometric optimization parameters include:
a quantity of a variable design feature;
a size of the variable design feature; or
a shape of the variable design feature; and
the variable design feature includes a hole, a fillet, or a chamfer.

18. A gear for transmitting torque, comprising:
a steel toothed annular flange having gear teeth defined on a periphery thereof;
a steel hub coaxially aligned with the steel toothed annular flange;
a web formed from a web material having a density less than or equal to 3.0 grams per cubic centimeter (g/cm3), the web fixedly attached to the steel toothed annular flange and to the steel hub for rotation therewith;
a plurality of first lugs defined at spaced intervals on an interior surface of the steel toothed annular flange;
a plurality of first grooves defined in an outer web circumferential surface wherein the plurality of the first grooves is complementary to the plurality of the first lugs, and wherein a total quantity of the first grooves is at least equal to a total quantity of the first lugs;
a plurality of second lugs defined at spaced intervals on an exterior surface of the steel hub; and
a plurality of second grooves defined in an inner web circumferential surface wherein the plurality of second grooves is complementary to the plurality of the second lugs, and wherein a total quantity of the second grooves is at least equal to a total quantity of the second lugs;
wherein:
the gear is to operatively transmit a torque of at least 500 Newton Meters (N·m) for at least 6 million revolutions of the gear;
an overall mass of the gear is less than two-thirds of an overall mass of a same-sized all steel gear having a solid steel web with a solid steel web thickness at least one-third of a face width of the steel toothed annular flange;
the web material is a glass fiber reinforced polymer composite;
the web material includes a plurality of layers of fiberglass reinforcement;
each layer includes fibers aligned parallel to a layer fiber alignment axis of each layer;
the layer fiber alignment axis of each layer is skewed with an adjacent layer fiber alignment axis of an adjacent layer;

the web is bonded to the steel toothed annular flange with a first layer of an adhesive; and the web is bonded to the steel hub with a second layer of the adhesive;

a first ratio of a first lug arc length to a first inter-lug space arc length is equal to a first strength ratio of a shear strength of the web material to a shear strength of the steel in the steel toothed annular flange;

a second ratio of a second lug arc length to a second inter-lug space arc length is equal to a second strength ratio of the shear strength of the web material to a shear strength of the steel in the steel hub;

the first lug arc length and the first inter-lug space arc length are determined at a first root circle of the plurality of the first lugs;

the second lug arc length and the second inter-lug space arc length are determined at a second root circle of the plurality of the second lugs;

the web has a uniform web thickness except where lightening apertures are defined in the web; and a total quantity of the lightening apertures is thirteen.

19. A gear for transmitting torque, comprising:

a steel toothed annular flange having gear teeth defined on a periphery thereof;

a steel hub coaxially aligned with the steel toothed annular flange; and a web formed from a web material having a density less than or equal to 3.0 grams per cubic centimeter (g/cm$^3$), the web fixedly attached to the steel toothed annular flange and to the steel hub for rotation therewith, a plurality of first lugs defined at spaced intervals on an interior surface of the steel toothed annular flange;

a plurality of first grooves defined in an outer web circumferential surface wherein the plurality of the first grooves is complementary to the plurality of the first lugs, and wherein a total quantity of the first grooves is at least equal to a total quantity of the first lugs;

a plurality of second lugs defined at spaced intervals on an exterior surface of the steel hub; and a plurality of second grooves defined in an inner web circumferential surface wherein the plurality of second grooves is complementary to the plurality of the second lugs, and wherein a total quantity of second grooves is at least equal to a total quantity of the second lugs;

wherein:

the gear is to operatively transmit a torque of at least 500 Newton Meters (N·m) for at least 6 million revolutions of the gear;

an overall mass of the gear is less than two-thirds of an overall mass of a same-sized all steel gear having a solid steel web with a solid steel web thickness at least one-third of a face width of the steel toothed annular flange;

a first ratio of a first lug arc length to a first inter-lug space arc length is equal to a first strength ratio of a shear strength of the web material to a shear strength of the steel in the steel toothed annular flange;

a second ratio of a second lug arc length to a second inter-lug space arc length is equal to a second strength ratio of the shear strength of the web material to a shear strength of the steel in the steel hub;

the first lug arc length and the first inter-lug space arc length are determined at a first root circle of the plurality of the first lugs; and the second lug arc length and the second inter-lug space arc length are determined at a second root circle of the plurality of the second lugs.

20. The gear as defined in claim 19 wherein the web has a uniform web thickness.

21. The gear as defined in claim 19 wherein a plurality of lightening apertures are defined in the web, and the web has a uniform web thickness except in locations on the web where each of the lightening apertures is defined in the web.

22. The gear as defined in claim 21 wherein the web material is a fiber reinforced polymer composite and wherein the total quantity of the lightening apertures is thirteen.

\* \* \* \* \*